US012607547B2

(12) United States Patent
Brown et al.

(10) Patent No.: US 12,607,547 B2
(45) Date of Patent: Apr. 21, 2026

(54) APPARATUS AND METHOD FOR SAMPLING FLUID AND ANALYZING FLUID SAMPLES

(71) Applicant: Honeywell International Inc., Charlotte, NC (US)

(72) Inventors: Andy Walker Brown, Richardson, TX (US); Seong Eyl Lee, Allen, TX (US); Adam Dewey Mcbrady, Dallas, TX (US)

(73) Assignee: Honeywell International Inc., Charlotte, NC (US)

( * ) Notice: Subject to any disclaimer, the term of this patent is extended or adjusted under 35 U.S.C. 154(b) by 1091 days.

(21) Appl. No.: 17/644,560

(22) Filed: Dec. 15, 2021

(65) Prior Publication Data

US 2023/0184657 A1 Jun. 15, 2023

(51) Int. Cl.
*G01N 15/02* (2024.01)
*G01N 15/0205* (2024.01)
(Continued)

(52) U.S. Cl.
CPC ......... *G01N 15/0205* (2013.01); *G01N 15/06* (2013.01); *G01N 2015/016* (2024.01); *G01N 2015/0233* (2013.01); *G01N 15/075* (2024.01)

(58) Field of Classification Search
CPC ............... G01N 15/1459; G01N 15/06; G01N 15/0205; G01N 15/1433; G01N 15/1429;
(Continued)

(56) References Cited

U.S. PATENT DOCUMENTS

2006/0274309 A1* 12/2006 Cerni ................. G01N 15/1459
356/338
2012/0002029 A1* 1/2012 Sieracki ............. G01N 21/6456
348/79
(Continued)

FOREIGN PATENT DOCUMENTS

WO 2009/094034 A1 7/2009

OTHER PUBLICATIONS

Baxter, 2022 [online], Renal Care, retrieved from the internet: https://www.baxter.com/healthcare-professionals/renal-care, 12 pgs.
(Continued)

*Primary Examiner* — Sang H Nguyen
(74) *Attorney, Agent, or Firm* — Alston & Bird LLP

(57) ABSTRACT

Apparatuses and methods for analyzing fluid samples are provided. For example, an example apparatus may include a fluid imaging chamber, at least one illumination source component, and an image sensor component. In some examples, the fluid imaging chamber comprises a flow channel for receiving a fluid sample. In some examples, the at least one illumination source component is configured to emit at least one light beam, and the at least one light beam is directed through the fluid sample in the flow channel from a top surface of the fluid imaging chamber. In some embodiments, the image sensor component is positioned under a bottom surface of the fluid imaging chamber and configured to generate digital holography image data of the fluid sample.

20 Claims, 14 Drawing Sheets

(51) Int. Cl.

| | |
|---|---|
| *G01N 15/06* | (2024.01) |
| *G01N 15/01* | (2024.01) |
| *G01N 15/0227* | (2024.01) |
| *G01N 15/075* | (2024.01) |

(58) Field of Classification Search

CPC .......... G01N 15/1434; G01N 15/0227; G01N 15/075; G01N 2015/1006; G01N 2015/1493; G01N 2015/1454; G01N 2015/016; G01N 2015/0233; G01N 2015/1486; A61B 5/14507; A61B 5/0036; A61B 5/6866; A61B 5/0022; A61B 5/14546; A61B 5/414; A61B 5/0013; A61B 5/4848; A61B 5/0059; A61B 2505/05; A61B 2505/07

See application file for complete search history.

(56) References Cited

U.S. PATENT DOCUMENTS

| | | | | |
|---|---|---|---|---|
| 2014/0146157 | A1* | 5/2014 | Duplisea | H04N 7/18 348/79 |
| 2015/0024373 | A1* | 1/2015 | Xia | F04B 43/043 435/308.1 |
| 2016/0146823 | A1* | 5/2016 | Chiu | G01N 33/5304 506/9 |
| 2017/0082530 | A1* | 3/2017 | Sieracki | G01N 15/1433 |
| 2019/0011882 | A1 | 1/2019 | Gusyatin | |
| 2020/0005947 | A1 | 1/2020 | Blanchard et al. | |
| 2020/0231927 | A1 | 7/2020 | Masaeli et al. | |
| 2021/0186434 | A1 | 6/2021 | Yu et al. | |
| 2021/0215666 | A1 | 7/2021 | Kotanko et al. | |

OTHER PUBLICATIONS

Byonyks, 2022 [online] retrieved from the internet URL: https://byonyks.com/, 12 pgs.

Cloudcath, 2022 [online], Remote Monitoring Platform for Catheter-Based Treatments, retrieved from the internet: https://www.cloudcath.com/, 7 pgs.

Fresenius Medical Care, 2006-2022 [online], retrieved from the internet: https://fmcna.com/, 6 pgs.

Fresenius Medical Care, 2021 [online], Home Hemodialysis, retrieved from the internet: https://www.nxstage.com/, 7 pgs.

Holmarc Opto-Mechatronics Ltd, 2022 [online] retrieved from the internet: https://www.holmarc.com/dihm.php, 22 pgs.

IMEC, 2022 [online], Lens-free imaging microscopes, retrieved from the internet: https://www.imec-int.com/en/lens-free-microscopy, 10 pgs.

Sigtuple Technologies Private Limited, 2015-2021 [online], SigTuple Combined Robotics & Artificial Intelligence, retrieved from the internet: https://sigtuple.com/, 9 pgs.

EP Office Action Mailed on May 8, 2024 for EP Application No. 22206690, 13 page(s).

European search report Mailed on May 10, 2023 for EP Application No. 22206690, 11 page(s).

Communication about intention to grant a European patent Mailed on Dec. 18, 2025 for EP Application No. 22206690, 6 page(s).

* cited by examiner

600

900

START —901

CAUSE THE AT LEAST ONE ILLUMINATION
SOURCE COMPONENT TO EMIT THE AT LEAST
ONE LIGHT BEAM —903

RECEIVE THE DIGITAL HOLOGRAPHY IMAGE
DATA FROM THE IMAGE SENSOR COMPONENT —905

GENERATE A FOCUSED IMAGE BASED ON THE
DIGITAL HOLOGRAPHY IMAGE DATA —907

DETERMINE ESTIMATED SAMPLE
CHARACTERISTICS DATA ASSOCIATED WITH
THE FLUID SAMPLE —909

911— END

1100

START —1101

DETERMINE ESTIMATED SAMPLE CHARACTERISTICS DATA ASSOCIATED WITH THE FLUID SAMPLE —1103

ESTIMATED SAMPLE CHARACTERISTICS DATA SATISFIES A SAMPLE CHARACTERISTICS THRESHOLD? —1105          NO

YES

GENERATE AN ELECTRONIC NOTIFICATION COMPRISING AN INFECTION INDICATION —1107

TRANSMIT THE ELECTRONIC INDICATION TO A MOBILE COMPUTING DEVICE —1109

1111— END

APPARATUS AND METHOD FOR SAMPLING FLUID AND ANALYZING FLUID SAMPLES

FIELD OF THE INVENTION

Example embodiments of the present disclosure relate generally to analytics of fluid samples and, more particularly, to apparatuses and methods for sampling fluid and analyzing fluid samples.

BACKGROUND

Applicant has identified many technical challenges and difficulties associated with sampling fluids and analyzing fluid samples. For example, many methods and systems fail to provide an effective mechanism that allows peritoneal dialysis (PD) effluent to be analyzed.

BRIEF SUMMARY

Various embodiments described herein relate to methods, apparatuses, and systems for sampling fluid and analyzing fluid samples.

In accordance with various embodiments of the present disclosure, an apparatus is provided. In some embodiments, the apparatus comprises a fluid imaging chamber, at least one illumination source component, and an image sensor component.

In some embodiments, the fluid imaging chamber comprises a flow channel for receiving a fluid sample.

In some embodiments, the at least one illumination source component is configured to emit at least one light beam. In some embodiments, the at least one light beam is directed through the fluid sample in the flow channel from a top surface of the fluid imaging chamber.

In some embodiments, an image sensor component is positioned under a bottom surface of the fluid imaging chamber. In some embodiments, the image sensor component is configured to generate digital holography image data of the fluid sample.

In some embodiments, the fluid imaging chamber is removable.

In some embodiments, the fluid imaging chamber comprises a fluidic inlet and a fluidic outlet. In some embodiments, the fluidic inlet is connected to a fluid input conduit for injecting the fluid sample to the flow channel. In some embodiments, the fluidic outlet is connected to a fluid output conduit for discharging the fluid sample from the flow channel.

In some embodiments, the fluid sample is associated with peritoneal dialysis (PD) effluent.

In some embodiments, the at least one light beam comprises coherent light. In some embodiments, the at least one illumination source component comprises a laser diode.

In some embodiments, the at least one light beam comprises at least partially incoherent light. In some embodiments, the at least one illumination source component comprises a light emitting diode (LED).

In some embodiments, an example apparatus further comprises a processor component in electronic communication with the at least one illumination source component and the image sensor component. In some embodiments, the processor component is configured to cause the at least one illumination source component to emit the at least one light beam and receive the digital holography image data from the image sensor component.

In some embodiments, the processor component is configured to: transmit the digital holography image data to a remote computing platform that generates estimated sample characteristics data associated with the fluid sample based at least in part on the digital holography image data.

In some embodiments, the estimated sample characteristics data comprises an estimated concentration level of white blood cells within the fluid sample.

In some embodiments, the estimated sample characteristics data comprises estimated size values of particles within the fluid sample.

In some embodiments, the processor component is configured to determine estimated sample characteristics data associated with the fluid sample based at least in part on applying at least one machine learning model on the digital holography image data.

In accordance with various embodiments of the present disclosure, a method for analyzing fluid samples is provided. In some embodiments, the method comprises causing at least one illumination source component of a fluid sampling and analyzing device to emit at least one light beam, receiving digital holography image data from an image sensor component of the fluid sampling and analyzing device, and determining estimated sample characteristics data associated with the fluid sample based at least in part on applying at least one machine learning model on the digital holography image data.

In some embodiments, the fluid sampling and analyzing device comprises a fluid imaging chamber. In some embodiments, the fluid sampling and analyzing device comprises a flow channel for receiving a fluid sample. In some embodiments, the at least one light beam is directed through the fluid sample in the flow channel from a top surface of the fluid imaging chamber. In some embodiments, the image sensor component is positioned under a bottom surface of the fluid imaging chamber.

In some embodiments, the fluid imaging chamber of the fluid sampling and analyzing device comprises a fluidic inlet and a fluidic outlet. In some embodiments, the fluidic inlet of the fluid sampling and analyzing device is connected to a fluid input conduit for injecting the fluid sample to the flow channel. In some embodiments, the fluidic outlet of the fluid sampling and analyzing device is connected to a fluid output conduit for discharging the fluid sample from the flow channel.

In some embodiments, the fluid sample that is received by the fluid sampling and analyzing device is associated with PD effluent.

In some embodiments, the at least one illumination source component of the fluid sampling and analyzing device comprises a laser diode. In some embodiments, the at least one light beam comprises at least partially coherent light.

In some embodiments, the at least one illumination source component of the fluid sampling and analyzing device comprises a light emitting diode (LED). In some embodiments, the at least one light beam comprises at least partially incoherent light.

In some embodiments, the estimated sample characteristics data comprises an estimated concentration level of white blood cells within the fluid sample.

In some embodiments, the estimated sample characteristics data comprises estimated size values of particles within the fluid sample.

In some embodiments, the example method further comprises transmitting the digital holography image data to a remote computing platform that generates the estimated sample characteristics data associated with the fluid sample based at least in part on the digital holography image data.

In some embodiments, the estimated sample characteristics data comprises an estimated concentration level of white blood cells within the fluid sample.

In some embodiments, the estimated sample characteristics data comprises estimated size values of particles within the fluid sample.

In accordance with various embodiments of the present disclosure, a computer program product is provided. The computer program product comprises at least one non-transitory computer-readable storage medium having computer-readable program code portions stored therein. The computer-readable program code portions comprise an executable portion configured to cause at least one illumination source component of a fluid sampling and analyzing device to emit at least one light beam, receive digital holography image data from an image sensor component of the fluid sampling and analyzing device, and determine estimated sample characteristics data associated with the fluid sample based at least in part on applying at least one machine learning model on the digital holography image data. In some embodiments, the fluid sampling and analyzing device comprises a fluid imaging chamber comprising a flow channel for receiving a fluid sample. In some embodiments, the at least one light beam is directed through the fluid sample in the flow channel from a top surface of the fluid imaging chamber. In some embodiments, the image sensor component is positioned under a bottom surface of the fluid imaging chamber.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
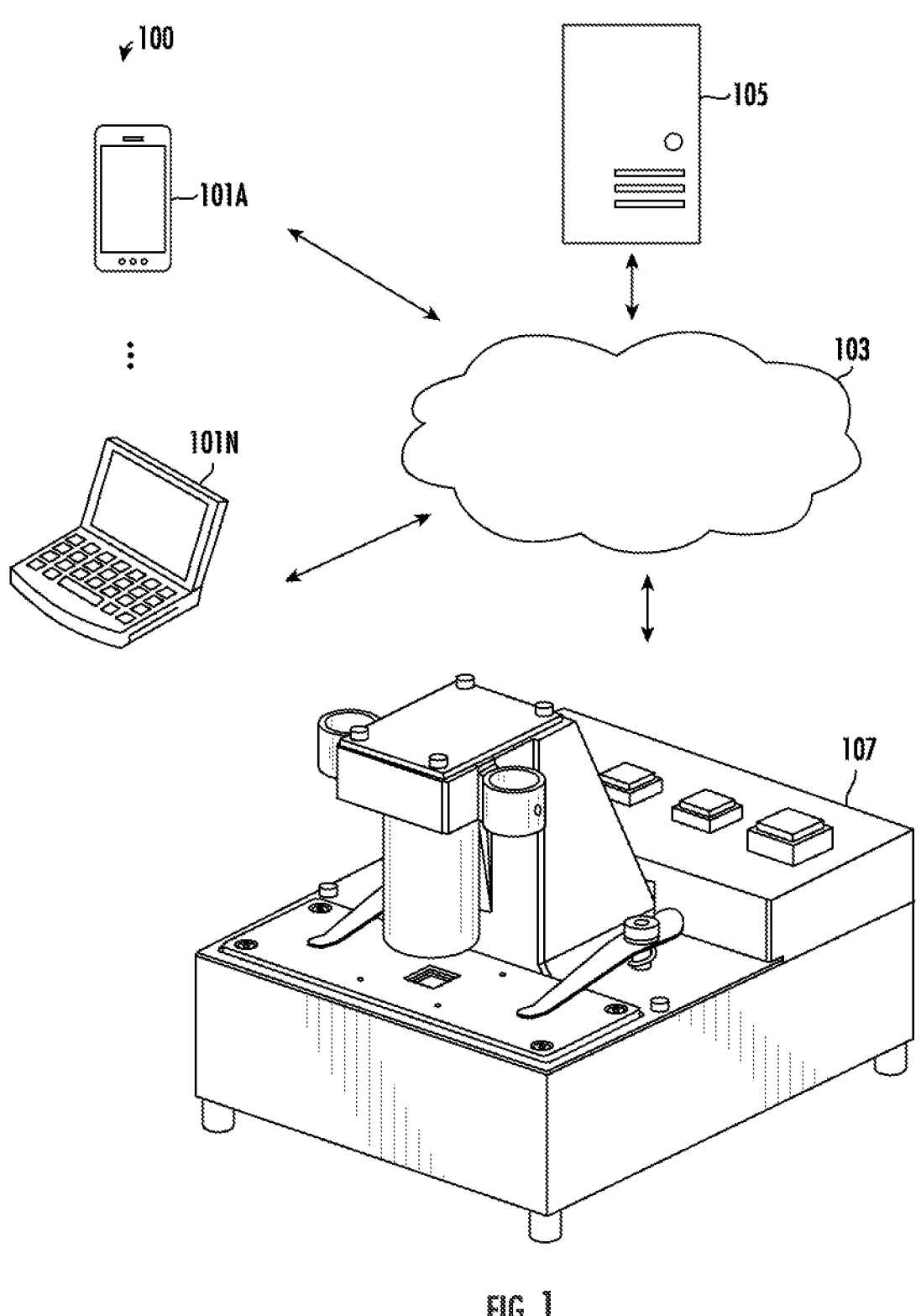
FIG. 1 illustrates an example fluid sampling and analyzing system in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

As described above, there are many technical challenges and difficulties associated with sampling fluids and analyzing fluid samples. For example, there are many technical challenges and difficulties related to medical analysis in renal care.

"Renal care" refers to medical care that provides diagnosis and treatment associated with the kidney (including but not limited to, chronic renal disease and/or acute renal disease). For example, when the patient's kidney stops working properly, renal care may include, but not limited to, performing dialysis procedures. The dialysis procedures are designed to remove waste products and excess fluids from the blood of the patient, and therefore improve the health of the patient.

Renal care is a huge federal expenditure, and medical care reimbursement guidelines are changing to shift more patients away from traditional hemodialysis (HD) to peritoneal dialysis (PD). In particular, PD provides a mechanism to remove waste products from a patient's blood when the patient's kidneys cannot adequately function, and PD is different from HD.

In particular, during an example PD procedure, a cleansing fluid (such as, but not limited to, a dialysis solution such as water with sugar and other additive) flows through a tube or a pipe (such as, but not limited to, a catheter) into the patient's body. More specifically, the cleansing fluid is injected into a part of a patient's abdomen. When the cleansing fluid is inside the patient's body, the cleansing fluid absorbs waste products from the patient's body. The lining of the abdomen (also known as peritoneum) can act as a filter and remove waste products from the patient's blood. After a set period of time, the fluid with the filtered waste products (referred herein as peritoneal dialysis (PD) effluent) flows out of the patient's abdomen and can be discarded.

In many instances, PD can be done by a patient at home. For example, a patient may use a PD machine to conduct PD procedure while the patient is sleeping. In contrast, HD must be performed in a health clinic by a trained healthcare professional. As such, PD can cost substantially less than HD, and can provide cost saving benefits.

However, PD procedures are faced with some drawbacks. One of the drawbacks is that patients who undergo PD may develop infections, which can force patients to switch back to HD. As such, early detection of infections after a patient undergoes PD can be beneficial for alerting patients, as well as care providers, so that early action can be taken to limit the severity and frequency of infections.

Various embodiments of the present disclosures overcome technical challenges and difficulties associated with sampling fluids and analyzing fluid samples, and address drawbacks faced by PD procedures. For example, various embodiments of the present disclosures include a fluid sampling and analyzing system in the field of peritoneal dialysis that provides an effective mechanism to sample and analyze PD effluent. For example, various embodiments of the present disclosure provide a fluid sampling and analyzing device that can take sampling images of the PD effluent. The sampling images of the PD effluent are visually assessed to determine cell counts (such as, but not limited to, white blood cell count) of the fluid. For example, the more white blood cells that there are in the PD effluent, the more likely that the patient is having an infection as the white blood cells make the PD effluent cloudy. As such, various embodiments of the present disclosure can detect indicators of infections based on the PD effluent, and can have the potential to detect infections earlier (which can lead to better patient outcomes) and provide better specificity in the detection results (for example, based on the concentrations of white blood cells and/or types of white blood cells).

In some embodiments, the fluid sampling and analyzing device works in tandem with a PD machine (also referred to as a "cycler"). For example, the fluid sampling and analyzing device may be integrated into the PD machine. Additionally, or alternatively, the fluid sampling and analyzing device may operate as a stand-alone device that is connected to the fluid conduit from the PD machine to receive the PD effluent. In particular, the fluid sampling and analyzing device comprises a fluid imaging chamber that is disposable and/or removable from the fluid sampling and analyzing device. As the PD effluent is pumped out of the patient's body, some of the fluid passes through the fluid imaging chamber. The fluid sampling and analyzing device may also include an image sensor component that can generate digital holography image data of the PD effluent.

In some embodiments, after the digital holography image data is generated, the fluid sampling and analyzing device may upload the digital holography image data to a remote computing platform. In some embodiments, the digital holography image data comprises digital holography image(s) of the PD effluent, and the remote computing platform can computationally generate reconstructed/focused image(s) based on the digital holography image(s). In some embodiments, estimated sample characteristics data associated with the fluid sample can be determined based on the reconstructed/focused image(s). For example, the reconstructed/focused image(s) can be provided to one or more machine learning models to detect, count, classify, and/or measure the sizes of the detected particles and cells from PD effluent as shown in the reconstructed/focused image(s). In some embodiments, the results (e.g. estimated sample characteristics data) can be provided to the end user (for example, patients, healthcare providers, etc.), enabling near-real-time analysis of the PD fluid contents and detection of infection.

Referring now to FIG. 1, an example diagram illustrating an example fluid sampling and analyzing system in accordance with some example embodiments described herein is provided.

As shown in FIG. 1, the example fluid sampling and analyzing system 100 may comprise apparatuses, devices, and components such as, but not limited to, a fluid sampling and analyzing device 107, one or more mobile computing devices 101A . . . 101N, a remote computing server 105 in a remote computing platform, and one or more networks 103.

While the description above provides an example fluid sampling and analyzing system, it is noted that the scope of the present disclosure is not limited to the description above. In some examples, an example fluid sampling and analyzing system 100 may comprise one or more additional and/or alternative elements. For example, an example fluid sampling and analyzing system in accordance with embodiments of the present disclosure may comprise more than one fluid sampling and analyzing device. Additionally, or alternatively, an example fluid sampling and analyzing system in accordance with embodiments of the present disclosure may comprise more than one remote computing server and/or more than one remote computing platform.

In some embodiments, each of the components of the example fluid sampling and analyzing system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

For example, the fluid sampling and analyzing device 107, one or more mobile computing devices 101A . . . 101N, the remote computing server 105 in the remote computing platform may be in electronic communication with one another to exchange data and information. As defined herein, the fluid sampling and analyzing device 107 may receive a fluid sample (such as, but not limited to, peritoneal dialysis effluent, urine, oil, and/or the like) and may generate digital holography image data associated with the fluid sample. In some embodiments, the fluid sampling and analyzing device 107 may transmit the digital holography image data to the one or more mobile computing devices 101A . . . 101N and/or the remote computing server 105 in the remote computing platform, and the one or more mobile computing devices 101A . . . 101N and/or the remote computing server 105 in the remote computing platform may determine estimated sample characteristics data associated with the fluid sample based at least in part on the digital holography image data. In some embodiments, the estimated sample characteristics data comprises an estimated concentration level of white blood cells within the fluid sample, estimated size values of particles within the fluid sample, and/or the like. In some embodiments, the one or more mobile computing devices 101A . . . 101N and/or the remote computing server 105 may transmit the estimated sample characteristics data to another device (such as, but not limited to, the fluid sampling and analyzing device 107, one of the one or more mobile computing devices 101A . . . 101N, and/or another remote computing server in the remote computing platform).

Additionally, or alternatively, the fluid sampling and analyzing device 107 may determine estimated sample characteristics data associated with the fluid sample based at least in part on the digital holography image data. In some embodiments, the estimated sample characteristics data comprises an estimated concentration level of white blood cells within the fluid sample, estimated size values of particles within the fluid sample, and/or the like. In some embodiments, the fluid sampling and analyzing device 107 may transmit the estimated sample characteristics data to another device (such as, but not limited to, the one or more mobile computing devices 101A . . . 101N and/or the remote computing server 105).

Figure 2A:
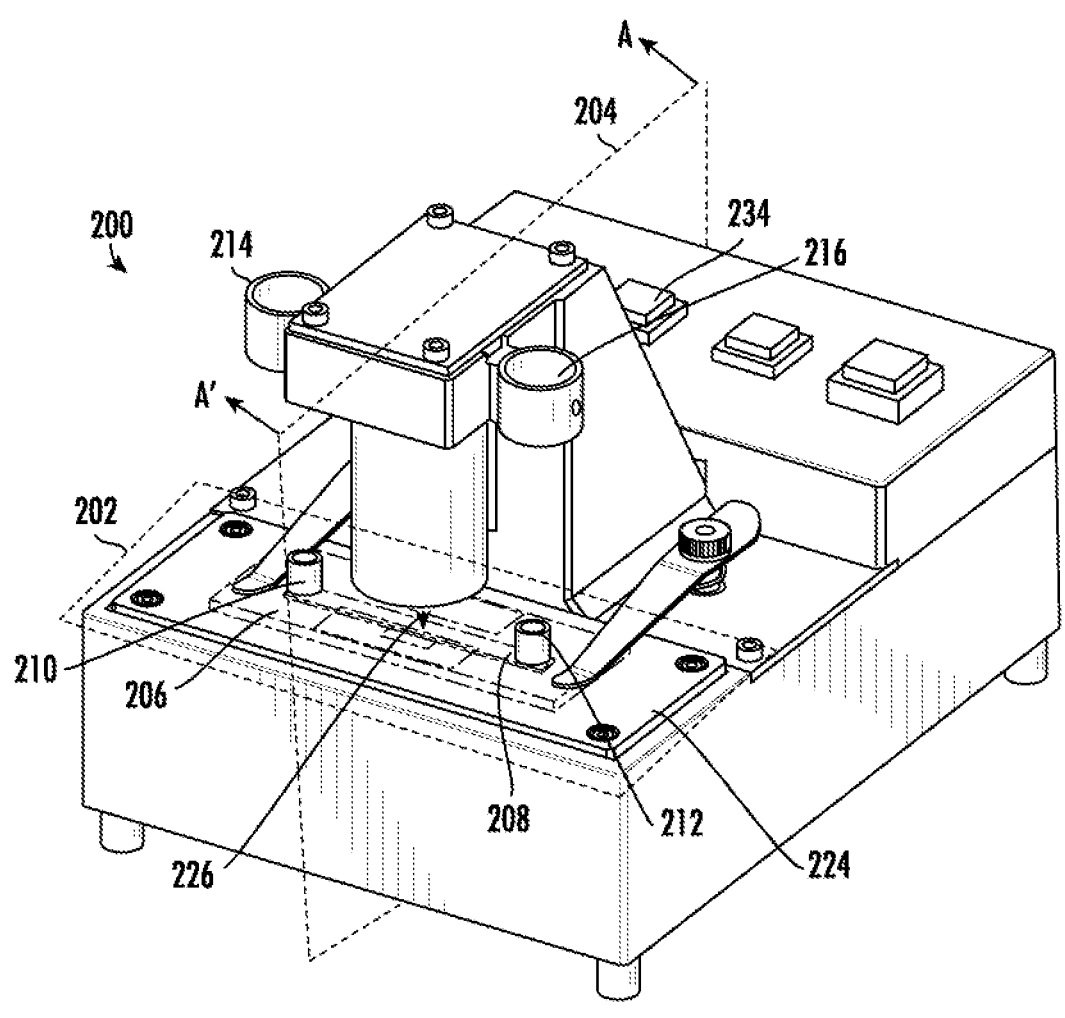
FIG. 2A illustrates an example perspective view of an example fluid sampling and analyzing device in accordance with some example embodiments described herein.
Figure 2B:
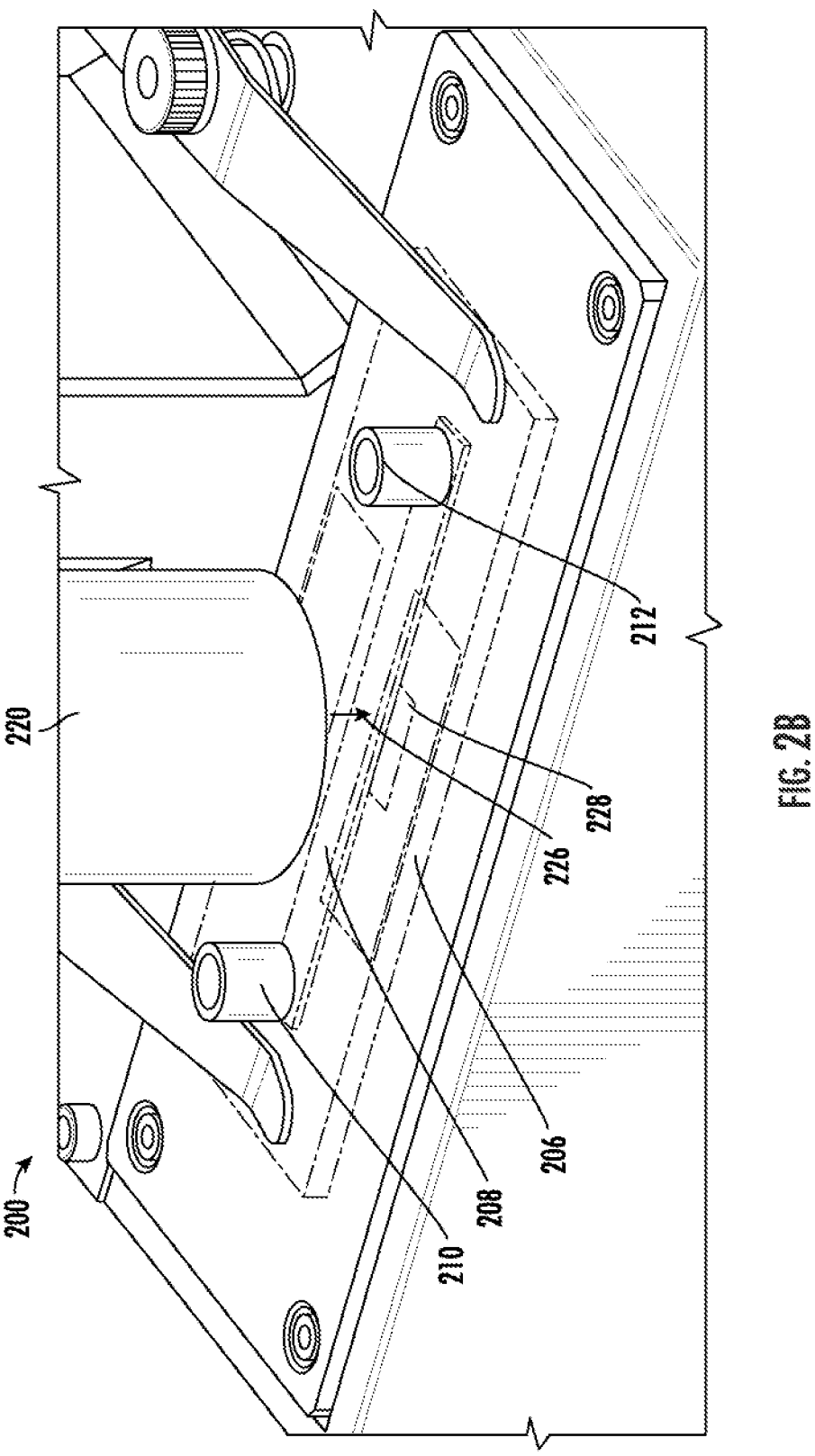
FIG. 2B illustrates an example zoomed view of a portion of the example fluid sampling and analyzing device shown in FIG. 2A in accordance with some example embodiments described herein.
Figure 2C:
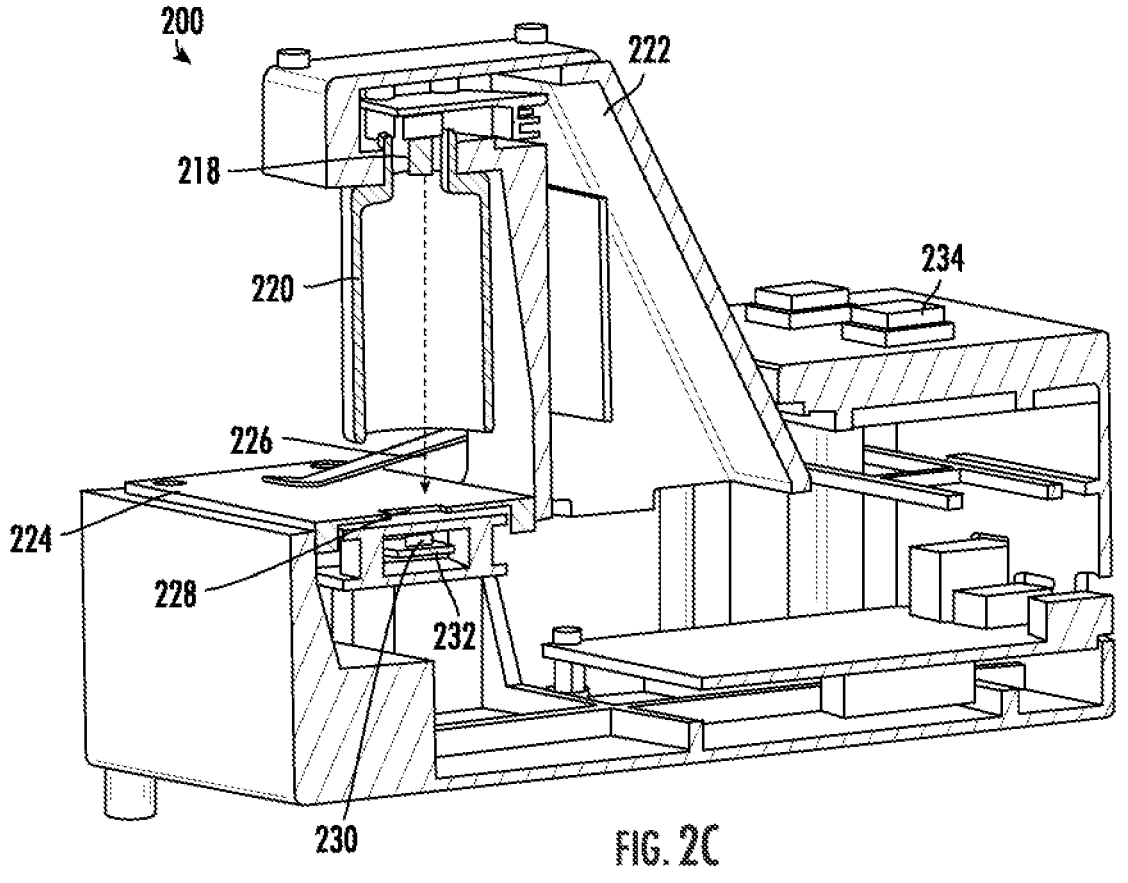
FIG. 2C illustrates an example cross-sectional view of the example fluid sampling and analyzing device shown in FIG. 2A in accordance with some example embodiments described herein.

Referring now to FIG. 2A to FIG. 2C, example views of an example fluid sampling and analyzing device 200 in accordance with various embodiments of the present disclosure is illustrated.

In particular, FIG. 2A illustrates an example perspective view of an example fluid sampling and analyzing device 200. FIG. 2B illustrates an example zoomed view of the portion 202 of the example fluid sampling and analyzing device 200 shown in FIG. 2A. FIG. 2C illustrates an example cross-sectional view of the example fluid sampling and analyzing device 200 shown in FIG. 2A that is created based on cutting the example fluid sampling and analyzing device 200 through the imaginary cut plane 204 and viewing in the directions as shown by A-A'.

Referring back to FIG. 2A, the example fluid sampling and analyzing device 200 comprises a fluid imaging chamber 206. In some embodiments, the fluid imaging chamber 206 defines a flow channel 208 for receiving a fluid sample.

In some embodiments, the fluid imaging chamber 206 may comprise transparent or semi-transparent, and/or translucent materials. For example, the fluid imaging chamber 206 may comprise glass. Additionally, or alternatively, the fluid imaging chamber 206 may comprise other material(s). In some embodiments, the fluid imaging chamber 206 may comprise material(s) that allow light beams to pass through.

In some embodiments, the fluid imaging chamber 206 may be in shape similar to a rectangular shape. For example, the fluid imaging chamber 206 may be shaped similar to a microscope slide. Additionally, or alternatively, the fluid imaging chamber 206 may be in other shapes.

In some embodiments, the fluid imaging chamber 206 may comprise a hollow portion that forms the flow channel 208. For example, the flow channel 208 of the fluid imaging chamber 206 may be in the form of a cavity that is within the fluid imaging chamber 206. The flow channel 208 provides a passageway for the fluid sample to travel inside the fluid imaging chamber 206. For example, the cavity may provide an opening for receiving a fluid sample, and another opening for discharging the fluid sample.

Referring now to FIG. 2B, the fluid imaging chamber 206 comprises a fluidic inlet 210 and a fluidic outlet 212.

In some embodiments, the fluidic inlet 210 is connected to a first end of the flow channel 208. In particular, the fluidic inlet 210 may be in a shape similar to a tube shape, and one end opening of fluidic inlet 210 is connected to a first end opening at the first end of the flow channel 208. In some embodiments, the fluidic inlet 210 protrudes from a top surface of the fluid imaging chamber 206. In some embodiments, the fluidic inlet 210 is disposed within the fluid imaging chamber 206.

Similarly, the fluidic outlet 212 is connected to a second end of the flow channel 208. In particular, the fluidic outlet 212 may be in a shape similar to a tube shape, and one end opening of fluidic outlet 212 is connected to a second end opening at the second end of the flow channel 208. In some embodiments, the fluidic outlet 212 protrudes from a top surface of the fluid imaging chamber 206. In some embodiments, the fluidic outlet 212 is disposed within the fluid imaging chamber 206.

In some embodiments, the first end of the flow channel 208 is opposite to the second end of the flow channel 208. In some embodiments, the fluidic inlet 210 may receive a fluid sample. The fluid sample may enter the flow channel 208 through the fluidic inlet 210, and may exit the flow channel 208 through the fluidic outlet 212.

In some embodiments, the fluidic inlet 210 may receive a fluid sample from a fluid input conduit. For example, the example fluid sampling and analyzing device may comprise a fluid input conduit holding ring 214. The fluid input conduit holding ring 214 may be secured to a side surface of the illumination source arm 222. In such an example, the fluid input conduit may be secured through the fluid input conduit holding ring 214 and connected to the fluidic inlet 210. The fluid input conduit may inject the fluid sample to the flow channel 208 through the fluidic inlet 210. In some embodiments, the fluid input conduit is replaceable.

In some embodiments, the fluidic outlet 212 may release the fluid sample to a fluid output conduit. For example, the example fluid sampling and analyzing device may comprise a fluid output conduit holding ring 216. The fluid output conduit holding ring 216 may be secured to a side surface of the illumination source arm 222. In such an example, the fluid output conduit may be secured through the fluid output conduit holding ring 216 and connected to the fluidic outlet 212. After the fluid sample travels through the flow channel 208, the fluid sample may be discharged from the flow channel through fluidic outlet 212 and into the fluid output conduit. In some embodiments, the fluid output conduit is replaceable.

In accordance with various embodiments of the present disclosure, the example fluid sampling and analyzing device 200 may be configured to receive different fluid samples.

In some embodiments, the fluid sample is associated with PD effluent. For example, the fluid sample may comprise PD effluent. In the present disclosure, the term "PD effluent" refers to a liquid that is discharged from a PD procedure. For example, the PD effluent may be a liquid that is discharged from a patient's body as an end product from performing a PD procedure on the patient. As described above, a dialysis solution is injected into the patient's body when a PD procedure is performed on the patient. The dialysis solution dwells within the patient's body and eventually is discharged as a PD effluent.

In some embodiments, the PD effluent may be received from a PD machine. For example, a discharging conduit of the PD machine that discharges fluids from the PD procedure can be connected to the fluidic inlet 210. In such an example, the fluid discharged from the PD machine is the PD effluent. As described above, the fluidic outlet 212 may be connected to a fluid output conduit to discharge the PD effluent.

While the description above provides an example of a fluid sample, it is noted that the scope of the present disclosure is not limited to the description above. In some examples, an example fluid sample may comprise one or more additional and/or alternative fluids. For example, the fluid sample may comprise urine. Additionally, or alternatively, the fluid sample may comprise oil. Additionally, or alternatively, the fluid sample may comprise blood.

In addition, while the description above provides example positions of the fluidic inlet and the fluidic outlet, it is noted that the scope of the present disclosure is not limited to the description above. In some examples, the fluidic inlet and/or the fluidic outlet may be positioned differently than those shown in FIG. 2A. For example, the fluidic inlet may be disposed within or protrude from a first side surface of the fluid imaging chamber 206. Additionally, or alternatively, the fluidic outlet may be disposed within or protrude from a second side surface of the fluid imaging chamber 206. In some embodiments, the first side surface of the fluid imaging chamber 206 is opposite to the second side surface of the fluid imaging chamber 206.

In some embodiments, the example fluid sampling and analyzing device 200 comprises at least one illumination source component. Referring now to FIG. 2C, an example illumination source component 218 is illustrated.

For example, the illumination source component 218 may be configured to produce, generate, emit, and/or trigger the production, generation, and/or emission of light. The example illumination source component 218 may include, but is not limited to, laser diodes (for example, violet laser diodes, visible laser diodes, edge-emitting laser diodes, surface-emitting laser diodes, and/or the like). Additionally, or alternatively, the illumination source component 218 may comprise one or more light-emitting diodes (LEDs). Additionally, or alternatively, the illumination source component 218 may comprise one or more other forms of natural and/or artificial sources of light.

In some embodiments, the at least one illumination source component is configured to emit at least one light beam. In some embodiments, the at least one light beam emitted by the at least one illumination source component may comprise coherent light. In the present disclosure, the term "coherent light" refers to a light beam where the frequency of the light and the waveform of the light are identical. Examples of coherent light include, but are not limited to, laser light. For example, the light beam in laser light has the same frequency and phase. In some embodiments, to emit coherent light, the at least one illumination source component includes, but is not limited to, laser diodes (for example, violet laser diodes, visible laser diodes, edge-emitting laser diodes, surface-emitting laser diodes, and/or the like).

In some embodiments, the at least one light beam emitted by the at least one illumination source component may comprise incoherent light or at least partially incoherent light. In the present disclosure, the term "incoherent light" (or "low coherence light" as used interchangeably herein) refers to a light beam where the frequency of the light and the waveform of the light are not identical. For example, incoherent light does not contain photons with the same frequency and does not have wavelengths that are in phase with one another. In some embodiments, to emit incoherent light, the at least one illumination source component includes, but is not limited to, light-emitting diodes (LEDs).

In the example shown in FIG. 2C, the illumination source component 218 is securely fixed to a top end of the illumination source arm 222. In particular, the illumination source arm 222 protrudes from a top surface of an imaging stage 224. As shown in FIG. 2A, the top surface of the imaging stage 224 may be horizontal, and the fluid imaging chamber 206 is positioned on the top surface of the imaging stage 224. As shown in FIG. 2C, the illumination source arm 222 elevates the illumination source component 218 to be above the top surface of the imaging stage 224. In some embodiments, the illumination source component 218 is positioned above the imaging stage 224 and directs at least one light beam downwards to the top surface of the imaging stage 224, as indicated by the light direction 226.

In some embodiments, the illumination source component 218 is positioned above the fluid imaging chamber 206. In some embodiments, the at least one light beam emitted by the illumination source component 218 is directed to a top surface of the fluid imaging chamber 206. For example, referring back to FIG. 2B, the light direction 226 indicates the direction of the at least one light beam that is emitted by the illumination source component 218. In the example shown in FIG. 2B, the at least one light beam is directed to the flow channel 208 through a top surface of the fluid imaging chamber 206. As described above, the fluid imaging chamber 206 may comprise transparent material, and the flow channel 208 may receive a fluid sample. In some embodiments, the at least one light beam is directed through the fluid sample in the flow channel 208 from a top surface of the fluid imaging chamber 206.

In some embodiments, the example fluid sampling and analyzing device 200 may comprise a shade covering 220. In some embodiments, the shade covering 220 is securely fixed to the top end of the illumination source arm 222, and the illumination source component 218 is disposed within the shade covering 220. In some embodiments, the shade covering 220 comprises materials that block light (such as, but not limited to, opaque materials). As such, the shade covering 220 may prevent stray light from interfering with the at least one light beam emitted by the illumination source component 218.

While the description above provides an example of positional relationships between the illumination source component 218 and the fluid imaging chamber 206, it is noted that the scope of the present disclosure is not limited to the description above. In some examples, an example illumination source component may be positioned differently with respect to the example fluid imaging chamber than the example shown in FIG. 2A to FIG. 2C.

Figure 3:
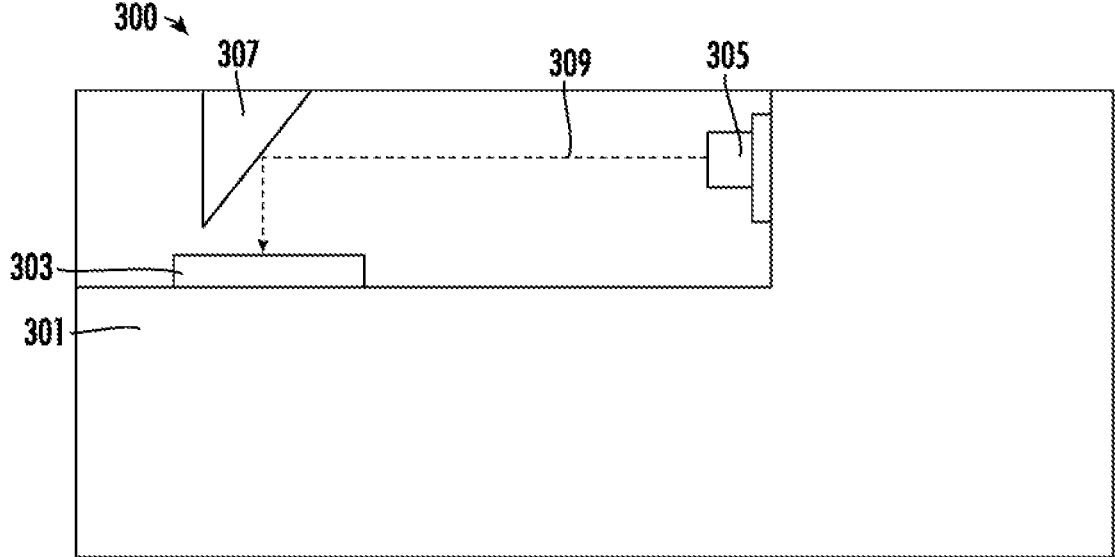
FIG. 3 is an example schematic representation of a portion of an example fluid sampling and analyzing device in accordance with some example embodiments described herein.

Referring now to FIG. 3, an example schematic representation of a portion of an example fluid sampling and analyzing device 300 is illustrated.

In the example shown in FIG. 3, the example fluid sampling and analyzing device 300 comprises an imaging stage 301. Similar to those described above, the example fluid sampling and analyzing device 300 comprises a fluid imaging chamber 303 that is positioned on a top surface of the imaging stage 301.

In contrast with the examples shown in FIG. 2A to FIG. 2C, the example illumination source component 305 shown in FIG. 3 is not positioned above fluid imaging chamber 303. In the example shown in FIG. 3, the example illumination source component 305 is positioned to the side of the fluid imaging chamber 303. Further, the example fluid sampling and analyzing device 300 comprises an angled mirror 307 that is positioned at an angle to the at least one light beam emitted by the example illumination source component 305. In some embodiments, the angled mirror 307 may reflect the at least one light beam emitted by the example illumination source component 305 onto the fluid imaging chamber 303.

For example, the example illumination source component 305 may emit the at least one light beam 309 horizontally. The angled mirror 307 may be positioned above the fluid imaging chamber 303 and at 45 degrees to the direction of the at least one light beam 309. As such, the angled mirror 307 can redirect the at least one light beam vertically into the fluid imaging chamber 303.

In some embodiments, by incorporating the angled mirror 307 into the example fluid sampling and analyzing device 300, various embodiments of the present disclosure can improve the quality of digital holography image data and the accuracy in generating estimated sample characteristics data. For example, the longer that a light beam is travelling vertically, the more likely that the light beam may diverge as various embodiments of the present disclosure may not implement any lenses. If the light beam is travelling horizontally as shown in FIG. 3, the light beam can travel a longer distance, thus improving the uniformity of the wave-front of the naturally diverging light beam that is incident on the fluid imaging chamber 303. Additionally, incorporating the angled mirror 307 into the example fluid sampling and analyzing device 300 can also reduce the size of the example fluid sampling and analyzing device 300.

Referring back to FIG. 2B and FIG. 2C, the imaging stage 224 may comprise at least one imaging opening 228. As shown in FIG. 2B, the fluid imaging chamber 206 is positioned on top of the at least one imaging opening 228. For example, a bottom surface of the fluid imaging chamber 206 covers the at least one imaging opening 228. In some embodiments, the bottom surface of the fluid imaging chamber 206 is opposite to the top surface of the fluid imaging chamber 206 described above.

As shown in FIG. 2C, an image sensor component 230 is positioned within the at least one imaging opening 228. For example, the example fluid sampling and analyzing device 200 comprises a sensor stage 232 that is positioned within the at least one imaging opening 228, and the image sensor component 230 is positioned on the sensor stage 232. As described above, the bottom surface of the fluid imaging chamber 206 covers the at least one imaging opening 228. As such, the image sensor component 230 is positioned under the bottom surface of the fluid imaging chamber 206.

As shown in FIG. 2B, the fluid imaging chamber 206 is positioned so that at least a portion of the flow channel 208 of the fluid imaging chamber 206 is positioned above the at least one imaging opening 228. As described above, the flow channel 208 receives a fluid sample, and the at least one light beam that is emitted by the illumination source component 218 is directed through the fluid sample in the flow channel 208 from a top surface of the fluid imaging chamber 206.

In some embodiments, the illumination source component 218 is aligned to the at least one imaging opening 228. For example, the at least one light beam emitted by the illumination source component 218 may enter the fluid imaging chamber 206 via the top surface of the fluid imaging chamber 206. As the fluid imaging chamber 206 comprises transparent materials, the at least one light beam travels through the fluid sample in the flow channel 208, and then exits the fluid imaging chamber 206 via the bottom surface of the fluid imaging chamber 206. Because the illumination source component 218 is aligned to the at least one imaging opening 228, the at least one light beam emitted by the illumination source component 218 then enters the at least one imaging opening 228, and arrives at the image sensor component 230. In some embodiments, the image sensor component 230 is configured to generate digital holography image data of the fluid sample in the flow channel 208 (e.g. the portion of the fluid sample that the at least one light beam travels through).

In the present disclosure, the term "digital holography image data" refers to image data that is generated based on digital holography techniques, including, but not limited to, lensless holography techniques. For example, the digital holography image data may be generated by the image sensor component 230 without any imaging lenses and without any adjustments. In such an example, there are no imaging lenses between the bottom surface of the fluid imaging chamber 206 and the image sensor component 230. The digital holography image data may comprise a digital holography image of the fluid sample (for example, various particles in the fluid sample). In some embodiments, the digital holography image is blurry and/or out of focus, and example embodiments of the present disclosure may generate estimated sample characteristics data associated with the fluid sample based at least in part on the digital holography image, details of which are described herein.

In some examples, the image sensor component 230 may comprise one or more imagers and/or image sensors. Various examples of the image sensor component 230 may include, but are not limited to, a charge-coupled device (CCD), a complementary metal-oxide semiconductor (CMOS) sensor, and/or the like. As described above, in some embodiments, the image sensor component 230 does not comprise any lenses so as to generate digital holography image data based on lensless holography techniques.

While the description above provides an example of implementing digital holography techniques, it is noted that the scope of the present disclosure is not limited to the description above. In some examples, an example fluid sampling and analyzing device may implement other imaging techniques. For example, example embodiments of the present disclosure may implement optical microscopy as the imaging technique. Additionally, or alternatively, example embodiments of the present disclosure may implement ultraviolet (UV) fluorescence as the imaging technique.

In some embodiments, the example fluid sampling and analyzing device 200 further comprises one or more buttons 234. In some embodiments, the one or more buttons 234 may control and/or adjust the operations of the example fluid sampling and analyzing device 200.

Figure 4:
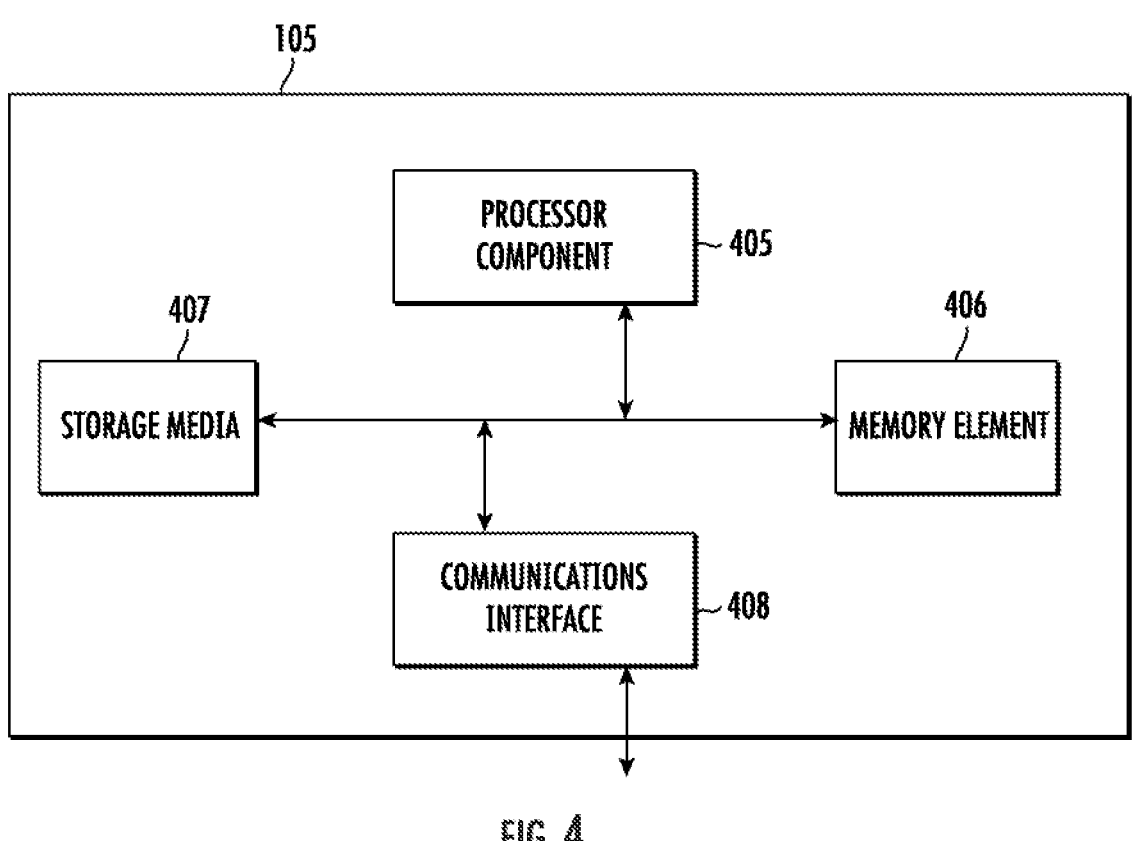
FIG. 4 is an example schematic representation of an example remote computing server of an example remote computing platform in accordance with some example embodiments described herein.

Referring now to FIG. 4, an example schematic representation of an example remote computing server in an example remote computing platform in accordance with some example embodiments described herein. In some embodiments, the example remote computing platform may be a cloud computing platform, and the example remote computing server may be a cloud computing server.

As indicated, in some embodiments, the remote computing server 105 may include one or more network and/or communications interface 408 for communicating with various computing entities, such as by communicating data, content, information, and/or similar terms used herein that can be transmitted, received, operated on, processed, displayed, stored, and/or the like. For instance, the remote computing server 105 may communicate with the fluid sampling and analyzing device 107, one or more mobile computing devices 101A . . . 101N, and/or the like.

As shown in FIG. 4, in one embodiment, the remote computing server 105 may include or be in communication with one or more processor components (for example, processor component 405) (also referred to as processors, processing circuitry, and/or similar terms used herein interchangeably) that communicate with other elements within the remote computing server 105 via a bus, for example, or network connection. As will be understood, the processor component 405 may be embodied in a number of different ways. For example, the processor component 405 may be embodied as one or more complex programmable logic devices (CPLDs), microprocessors, multi-core processors, co-processing entities, application-specific instruction-set processors (ASIPs), and/or controllers. Further, the processor component 405 may be embodied as one or more other processing devices or circuitry. The term circuitry may refer to an entirely hardware embodiment or a combination of hardware and computer program products. Thus, the processor component 405 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor component 405 may be configured for a particular use or configured to execute instructions stored in volatile or non-volatile media or otherwise accessible to the processor component 405. As such, whether configured by hardware or computer program products, or by a combination thereof, the processor component 405 may be capable of performing steps or operations according to embodiments of the present disclosure when configured accordingly.

In one embodiment, the remote computing server 105 may further include or be in communication with volatile media (also referred to as volatile storage, memory, memory storage, memory circuitry and/or similar terms used herein interchangeably). In one embodiment, the volatile storage or memory may also include one or more memory element 406 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 406 may be used to store at least portions of the databases, database instances, database management system entities, data, applications, programs, program modules, scripts, source code, object code, byte code, compiled code, interpreted code, machine code, executable instructions, and/or the like being executed by, for example, the processor component 405 as shown in FIG. 4. Thus, the databases, database instances, database management system entities, data, applications, programs, program modules, scripts, source code, object code, byte code, compiled code, interpreted code, machine code, executable instructions, and/or the like may be used to control certain aspects of the operation of the remote computing server 105 with the assistance of the processor component 405 and operating system.

In one embodiment, the remote computing server 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 407 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 407 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 407 may also be embodied as a data storage device or devices, as a separate database server or servers, or as a combination of data storage devices and separate database servers. Further, in some embodiments, storage media 407 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored.

As indicated, in one embodiment, the remote computing server 105 may also include one or more network and/or communications interface 408 for communicating with various computing entities, such as by communicating data, content, information, and/or similar terms used herein interchangeably that can be transmitted, received, operated on, processed, displayed, stored, and/or the like.

As indicated, in one embodiment, the remote computing server 105 may also include one or more network and/or communications interface 408 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the remote computing server 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The remote computing server 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the remote computing server's components may be located remotely from components of other remote computing servers, such as in a distributed system. Furthermore, one or more of the components may be aggregated and additional components performing functions described herein may be included in the remote computing server 105. Thus, the remote computing server 105 can be adapted to accommodate a variety of needs and circumstances.

Figure 5:
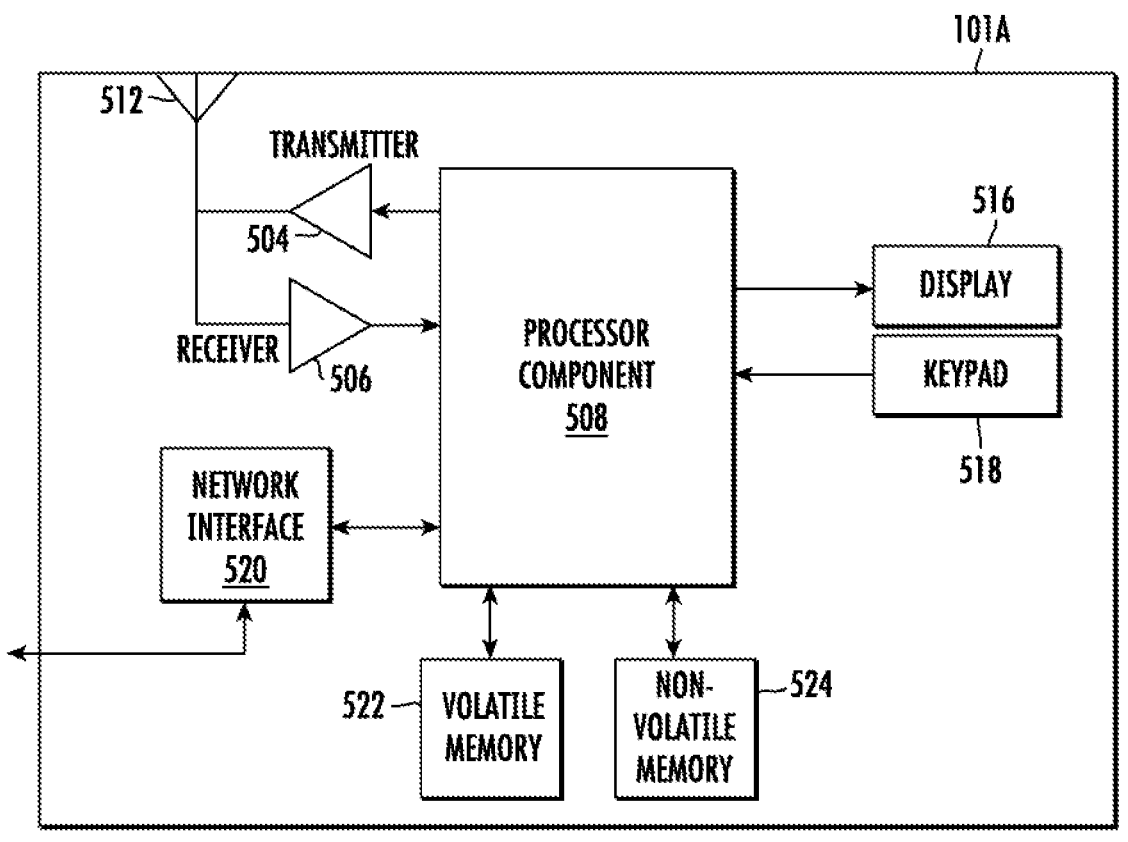
FIG. 5 is an example schematic representation of an example mobile computing device in accordance with some example embodiments described herein.

Referring now to FIG. 5, an example schematic representation of an example mobile computing device in accordance with some example embodiments described herein is provided.

FIG. 5 provides an illustrative schematic representative of one of the mobile computing devices 101A to 101N that can be used in conjunction with embodiments of the present disclosure.

For example, the mobile computing device 101A can include an antenna 512, a transmitter 504 (e.g., radio), a receiver 506 (e.g., radio), and a processor component 508 that provides signals to and receives signals from the transmitter 504 and receiver 506, respectively. The signals provided to and received from the transmitter 504 and the receiver 506, respectively, may include signaling information/data in accordance with an air interface standard of applicable wireless systems to communicate with various entities, such as a remote computing server 105, another mobile computing device 101A, an example fluid sampling and analyzing device and/or the like. In this regard, the mobile computing device 101A may be capable of operating with one or more air interface standards, communication protocols, modulation types, and access types. More particularly, the mobile computing device 101A may comprise a network interface 520, and may operate in accordance with any of a number of wireless communication standards and protocols. In a particular embodiment, the mobile computing device 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing device 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The mobile computing device 101A can also download changes, add-ons, and updates, for instance, to its firmware, software (e.g., including executable instructions, applications, program modules), and operating system.

The mobile computing device 101A may also comprise a user interface comprising one or more user input/output interfaces (e.g., a display 516 and/or speaker/speaker driver coupled to a processor component 508 and a touch screen, keyboard, mouse, and/or microphone coupled to a processor component 508). For example, the user output interface may be configured to provide an application, browser, user interface, dashboard, webpage, and/or similar words used herein interchangeably executing on and/or accessible via the mobile computing device 101A to cause display or audible presentation of information/data and for user interaction therewith via one or more user input interfaces. The user output interface may be updated dynamically from communication with the remote computing server 105. The user input interface can comprise any of a number of devices allowing the mobile computing device 101A to receive data, such as a keypad 518 (hard or soft), a touch display, voice/speech or motion interfaces, scanners, readers, or other input device. In embodiments including a keypad 518, the keypad 518 can include (or cause display of) the conventional numeric (0-9) and related keys (#, *), and other keys used for operating the mobile computing device 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing device 101A can collect information/data, user interaction/input, and/or the like.

The mobile computing device 101A can also include volatile storage or memory 522 and/or non-volatile storage or memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing device 101A-101N.

Figure 6:
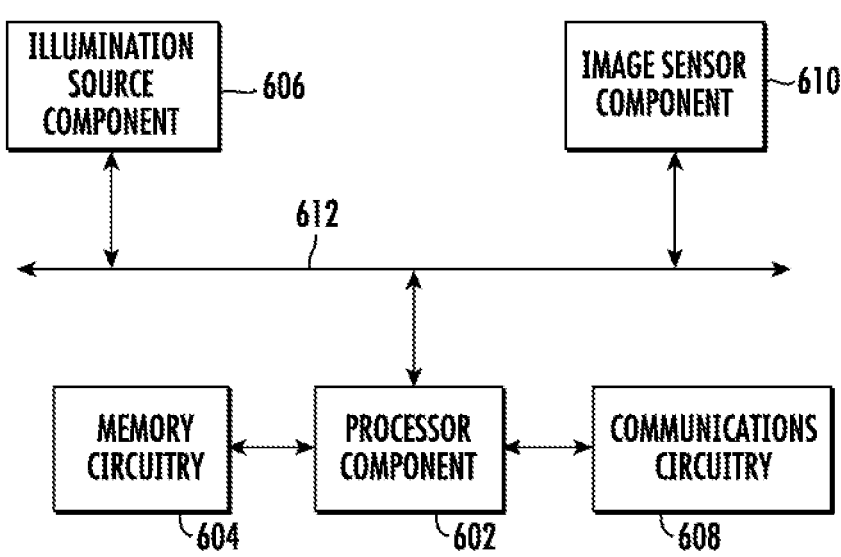
FIG. 6 is an example schematic representation of an example fluid sampling and analyzing device in accordance with some example embodiments described herein.

Referring now to FIG. 6, an example block diagram schematic representation of an example fluid sampling and analyzing device 600 in accordance with various embodiments of the present disclosure is illustrated.

In the example shown in FIG. 6, the example fluid sampling and analyzing device 600 comprises an illumination source component 606, an image sensor component 610, and a processor component 602 that are in electronic communication with one another via a system bus 612.

Similar to the various example processor components described above, the processor component 602 may be embodied as one or more other processing devices or circuitry. For example, the processor component 602 may be embodied as one or more complex programmable logic devices (CPLDs), microprocessors, multi-core processors, co-processing entities, application-specific instruction-set processors (ASIPs), and/or controllers. Further, the processor component 602 may be embodied as one or more other processing devices or circuitry. The term circuitry may refer to an entirely hardware embodiment or a combination of hardware and computer program products. Thus, the processor component 602 may be embodied as integrated circuits, ASICs, FPGAs, PLAs, hardware accelerators, other circuitry, and/or the like. As will therefore be understood, the processor component 602 may be configured for a particular use or configured to execute instructions stored in volatile or non-volatile media or otherwise accessible to the processor component 602, such as, but not limited not, the memory 604. As such, whether configured by hardware or computer program products, or by a combination thereof, the processor component 602 may be capable of performing steps or operations according to embodiments of the present disclosure when configured accordingly.

In some embodiments, the processor component 602 is electronic communications with the communications circuitry 608. In some embodiments, the communications circuitry 608 may be any means such as a device or circuitry embodied in either hardware or a combination of hardware and software that is configured to receive and/or transmit data from/to a network and/or any other device, circuitry, or module in communication with the example fluid sampling and analyzing device. In this regard, the communications circuitry 608 may include, for example, a network interface for enabling communications with a wired or wireless communication network. For example, the communications circuitry 608 may include one or more network interface cards, antennae, buses, switches, routers, modems, and supporting hardware and/or software, or any other device suitable for enabling communications via a network. Additionally or alternatively, the communications circuitry 608 may include the circuitry for interacting with the antenna/antennae to cause transmission of signals via the antenna/antennae or to handle receipt of signals received via the antenna/antennae. For example, the processor component 602 may communicate with one or more remote computing servers and/or one or more mobile computing devices via the communications circuitry 608.

In some embodiments, the processor component 602 may transmit control signals to the illumination source component 606 via the system bus 612 to turn the illumination source component 606 on or off.

In some embodiments, the image sensor component 610 may generate digital holography image data of the fluid sample, and may transmit the digital holography image data to the processor component 602. In some embodiments, the processor component 602 may transmit the digital holography image data to a remote computing platform and/or one or more mobile computing devices, details of which are described herein.

Referring now to FIG. 7, FIG. 8, FIG. 9, FIG. 10, and FIG. 11, example flow diagrams illustrating example methods of sampling fluid and analyzing fluid samples in accordance with some example embodiments described herein are provided.

It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 7, FIG. 8, FIG. 9, FIG. 10, and FIG. 11 may be embodied by computer program instructions, which may be stored by a non-transitory memory of an apparatus employing an embodiment of the present disclosure and executed by a processor component in an apparatus (such as, but not limited to, a fluid sampling and analyzing device, a mobile computing device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 7:
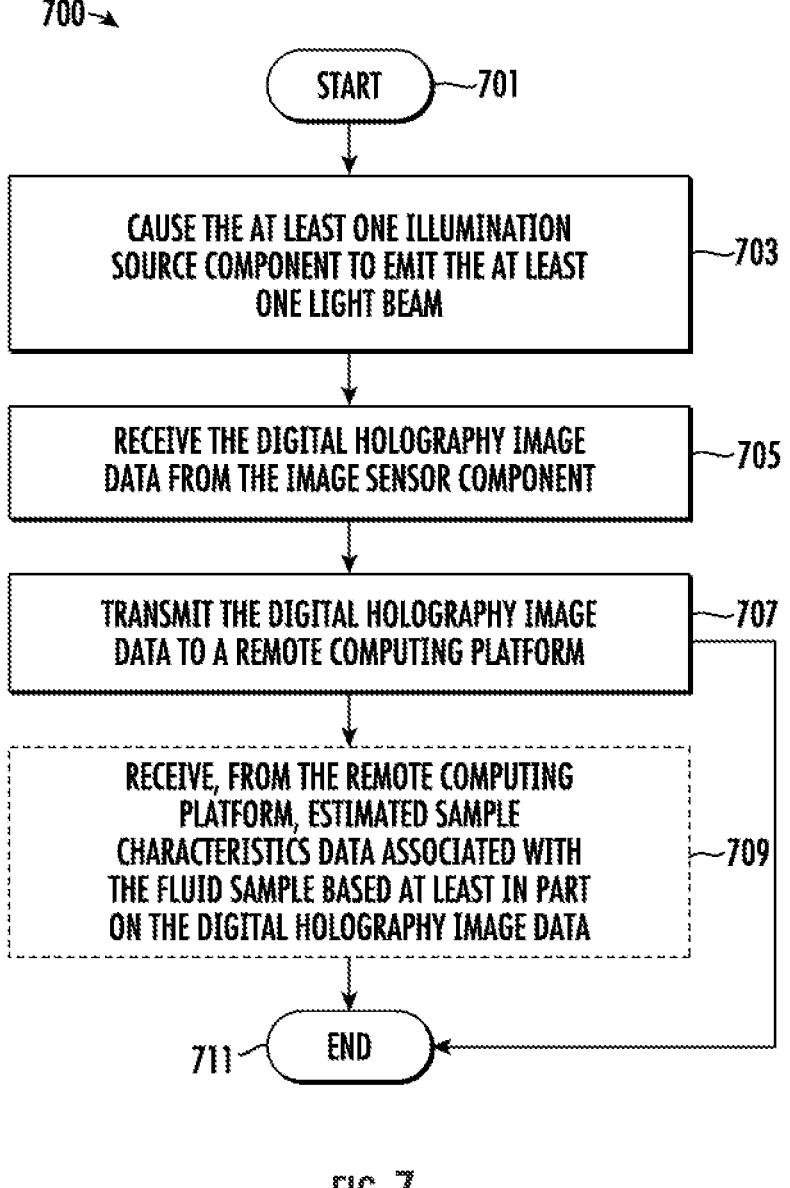
FIG. 7 is an example flow diagram illustrating an example method of determining estimated sample characteristics data in accordance with some example embodiments described herein.

Referring now to FIG. 7, an example method 700 of determining estimated sample characteristics data associated with the fluid sample in accordance with some example embodiments described herein is illustrated. In particular, FIG. 7 illustrates an example method where the example fluid sampling and analyzing device transmits the digital holography image data to a remote computing platform for processing.

In FIG. 7, the example method 700 starts at step/operation 701. In some embodiments, subsequent to and/or in response to step/operation 701, the example method 700 proceeds to step/operation 703. At step/operation 703, a processor component (such as, but not limited to, the processor component 602 of the example fluid sampling and analyzing device described in connection with FIG. 6 above) may cause the at least one illumination source component to emit the at least one light beam.

For example, the processor component may transmit a control signal to the at least one illumination source component to turn it on. In some embodiments, the at least one light beam comprises coherent light. For example, the at least one illumination source component comprises a laser diode.

Referring back to FIG. 7, subsequent to and/or in response to step/operation 703, the example method 700 proceeds to step/operation 705. At step/operation 705, a processor component (such as, but not limited to, the processor component 602 of the example fluid sampling and analyzing device described in connection with FIG. 6 above) may receive the digital holography image data from the image sensor component.

For example, as described above, the at least one illumination source component may be positioned above a fluid imaging chamber. In some embodiments, the fluid imaging chamber comprises a flow channel, and fluid samples may travel through the flow channel. In some embodiments, the at least one light beam emitted by the at least one illumination source component may be directed towards the fluid sample in the flow channel. In some embodiments, the fluid imaging chamber comprises transparent material, and the at least one light beam enters the fluid imaging chamber from a top surface of the fluid imaging chamber.

In some embodiments, the fluid imaging chamber is positioned above an image sensor component. For example, the at least one illumination source component and the image sensor component are aligned, so that the at least one light beam emitted by the at least one illumination source component travels past the fluid sample in the flow channel and enters the image sensor component.

In some embodiments, the image sensor component captures the light beam after it passes through the fluid sample in the flow channel and generates digital holography image data. For example, the image sensor component does not comprise any imaging lens, and the digital holography image data represent a digital holography image of the fluid sample. For example, the digital holography image data records light wave front information that originated from the fluid sample (for example, from the particles within the fluid sample) as a hologram.

Referring back to FIG. 7, subsequent to and/or in response to step/operation 705, the example method 700 proceeds to step/operation 707. At step/operation 707, a processor component (such as, but not limited to, the processor component 602 of the example fluid sampling and analyzing device described in connection with FIG. 6 above) may transmit the digital holography image data to a remote computing platform.

For example, the digital holography image data may comprise a digital holography image, and the processor component may transmit the digital holography image data to the remote computing platform for processing. For example, the remote computing platform may comprise a remote computing server that processes the digital holography image data.

Figure 8:
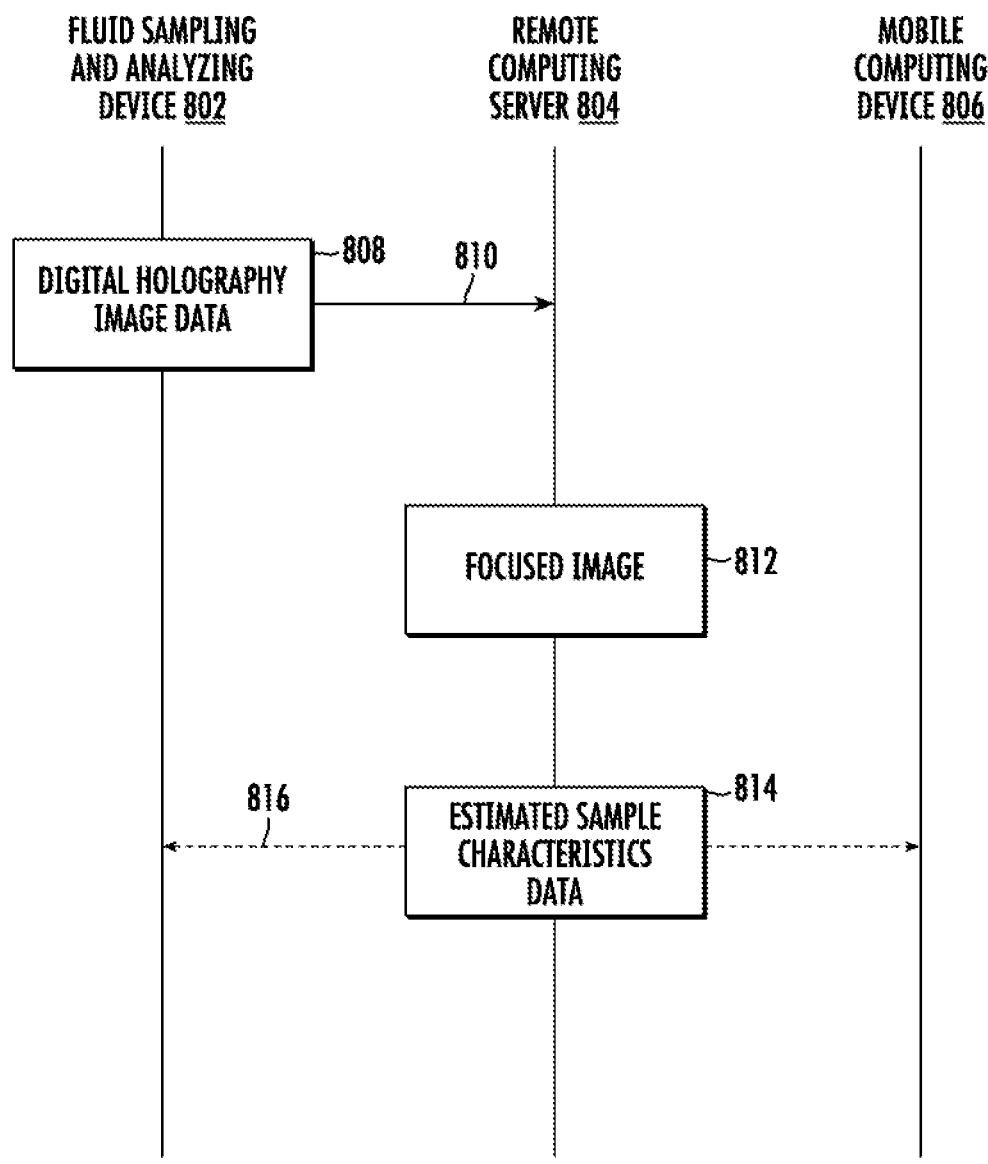
FIG. 8 is an example data flow diagram illustrating example data communications between a fluid sampling and analyzing device, a remote computing server, and a mobile computing device in accordance with some example embodiments described herein.

In some embodiments, to process the digital holography image data, the remote computing server may apply machine learning models and/or computing algorithms to focus and/or reconstruct the digital holography image. As described above, examples of the present disclosure may implement lensless holography. In such examples, the image sensor component does not capture a projected image of the fluid sample as the image sensor component does not comprise any lens. Instead, the image sensor component digitally records light wave front information that originated from the fluid sample (for example, from the particles within the fluid sample) as a hologram. Based on the wave front information, the remote computing server may generate a reconstructed/image using reconstruction algorithms, such as, but not limited to, Fourier-Domain reconstruction algorithm, angular spectrum method, iterative reconstruction algorithm, back projection algorithm, fan-beam reconstruction, deep learning reconstruction, and/or the like. As shown in FIG. 8, the fluid sampling and analyzing device 202 transmits the digital holography image data 808 to the remote computing server 804 at step/operation 810, and the remote computing server 804 generates the focused image 812.

In some embodiments, the remote computing server may apply machine learning models and/or computing algorithms on the reconstructed/focused digital holography image to determine estimated sample characteristics data associated with the fluid sample. For example, the remote computing server may train a machine learning model (such as, but not limited to, artificial neural network, convolutional neural network, k nearest neighbor, decision tree, support vector machines) based on historical digital holography image and their corresponding sample characteristics data, and may provide the reconstructed/image to the machine learning model to generate estimated sample characteristics data.

In some embodiments, the estimated sample characteristics data comprises an estimated concentration level of white blood cells within the fluid sample. For example, the estimated sample characteristics data may indicate an estimated white blood cell count in the fluid sample. As an example, the fluid sample may be PD effluent, and the remote computing server may train the machine learning model to identify concentration level of white blood cells within the fluid sample. The remote computing server may generate a reconstructed/focused image based on the digital holography image data, and provide the reconstructed/focused image to the machine learning model to generate the estimated concentration level of white blood cells within the fluid sample.

In some embodiments, the estimated sample characteristics data comprises estimated size values of particles within the fluid sample. For example, the fluid sample may be PD effluent, and the remote computing server may train the machine learning model to calculate the size values of particles within the fluid sample. The remote computing server may generate a reconstructed/focused image based on the digital holography image data, and provide the reconstructed/focused image to the machine learning model to generate the estimated size values of particles within the fluid sample.

Additionally, or alternatively, the remote computing server may generate other estimated sample characteristics data.

While the description above provides an example of transmitting the digital holography image data to a remote computing platform, it is noted that the scope of the present disclosure is not limited to the description above. In some examples, an example fluid sampling and analyzing device transmits the digital holography image data to a mobile computing device for processing.

Referring back to FIG. 7, subsequent to and/or in response to step/operation 707, the example method 700 proceeds to step/operation 711 and ends.

Optionally, in some embodiments, subsequent to and/or in response to step/operation 707, the example method 700 proceeds to step/operation 709. At step/operation 709, a processor component (such as, but not limited to, the processor component 602 of the example fluid sampling and analyzing device described in connection with FIG. 6 above) may receive, from the remote computing platform, estimated sample characteristics data associated with the fluid sample based at least in part on the digital holography image data.

For example, the estimated sample characteristics data may comprise an estimated concentration level of white blood cells within the fluid sample. Additionally, or alternatively, in some embodiments, the estimated sample characteristics data may comprise estimated size values of particles within the fluid sample.

As shown in FIG. 8, the remote computing server 804 transmits the estimated sample characteristics data 814 to the fluid sampling and analyzing device 802 and/or the mobile computing device 806 at step/operation 816.

Referring back to FIG. 7, subsequent to and/or in response to step/operation 709, the example method 700 proceeds to step/operation 711 and ends.

Figure 9:
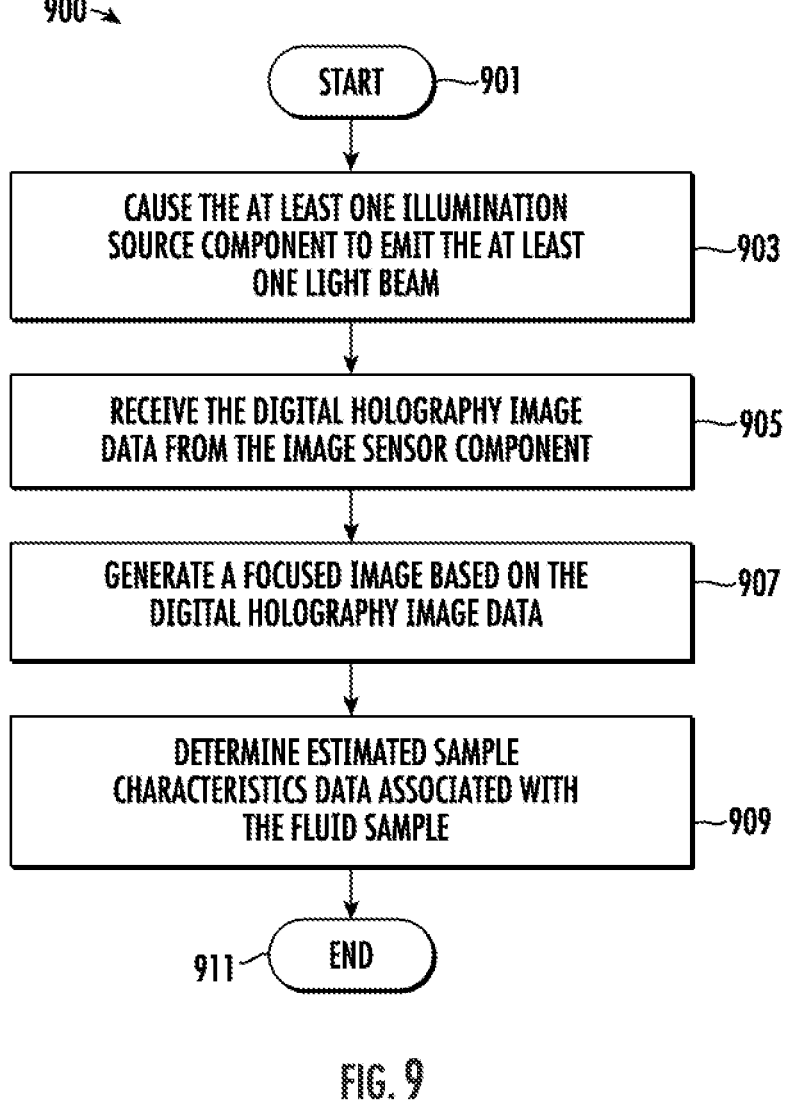
FIG. 9 is an example flow diagram illustrating an example method of determining estimated sample characteristics data in accordance with some example embodiments described herein.

Referring now to FIG. 9, an example method 900 of determining estimated sample characteristics data associated with the fluid sample in accordance with some example embodiments described herein is illustrated. In particular, FIG. 9 illustrates an example method where the example fluid sampling and analyzing device processes the digital holography image data on device.

In FIG. 9, the example method 900 starts at step/operation 901. In some embodiments, subsequent to and/or in response to step/operation 901, the example method 900 proceeds to step/operation 903. At step/operation 903, a processor component (such as, but not limited to, the processor component 602 of the example fluid sampling and analyzing device described in connection with FIG. 6 above) may cause the at least one illumination source component to emit the at least one light beam.

In some embodiments, the processor component may transmit a control signal to the at least one illumination source component to turn it on, similar to those described above in connection with at least step/operation 703 of FIG. 7.

Referring back to FIG. 9, subsequent to and/or in response to step/operation 903, the example method 900 proceeds to step/operation 905. At step/operation 905, a processor component (such as, but not limited to, the processor component 602 of the example fluid sampling and analyzing device described in connection with FIG. 6 above) may receive the digital holography image data from the image sensor component.

In some embodiments, the image sensor component does not comprise an imaging lens. In some embodiments, the digital holography image data records light wave front information that originated from the fluid sample (for example, from the particles within the fluid sample) as a hologram, similar to those described above.

Figure 10:
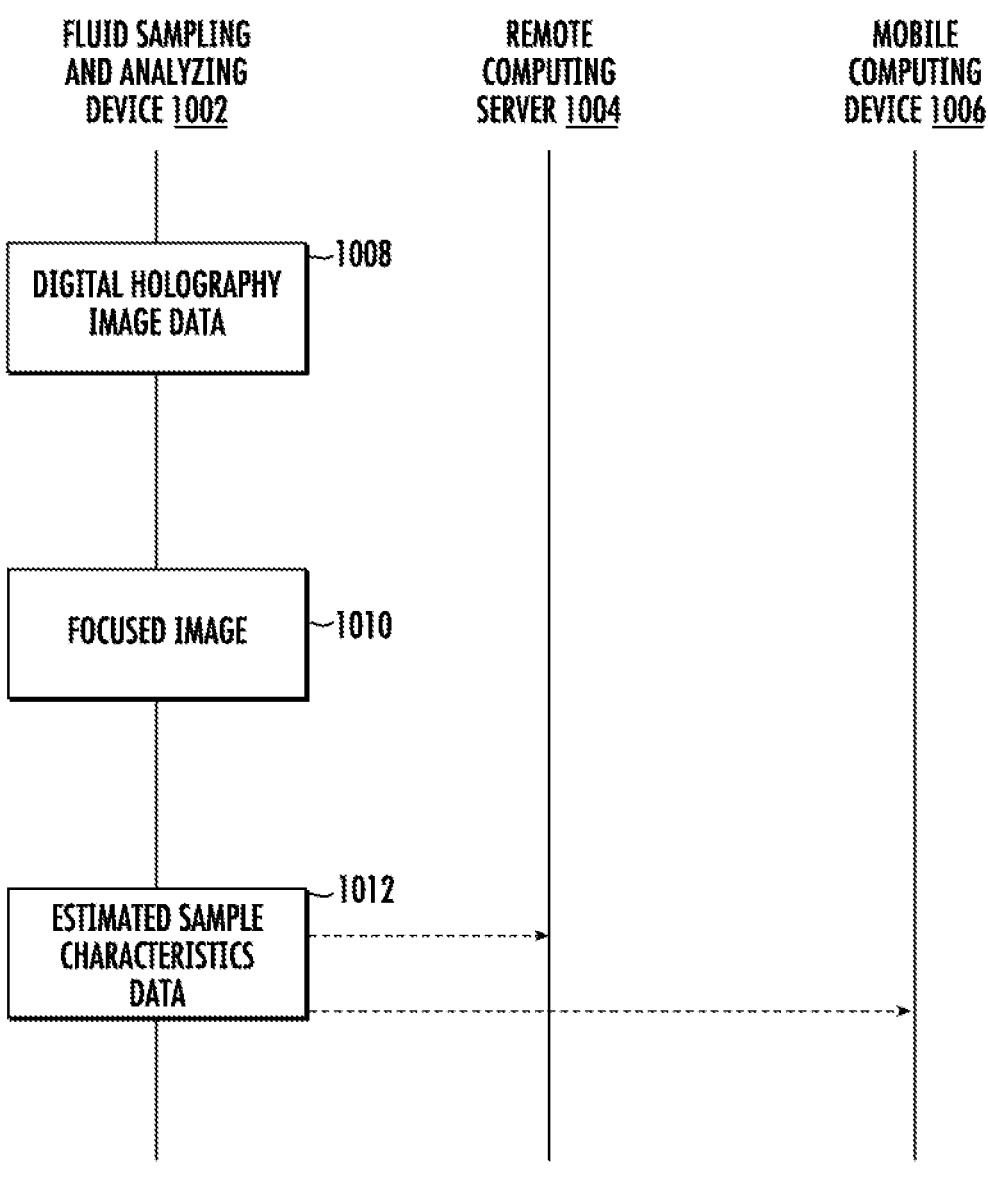
FIG. 10 is an example data flow diagram illustrating example data communications between a fluid sampling and analyzing device, a remote computing server, and a mobile computing device in accordance with some example embodiments described herein.

Referring to FIG. 10, the fluid sampling and analyzing device 1002 receives the digital holography image data 1008.

Referring back to FIG. 9, subsequent to and/or in response to step/operation 905, the example method 900 proceeds to step/operation 907. At step/operation 907, a processor component (such as, but not limited to, the processor component 602 of the example fluid sampling and analyzing device described in connection with FIG. 6 above) may generate a focused image based on the digital holography image data.

In some embodiments, the processor component may use reconstruction algorithms, such as, but not limited to, Fourier-Domain reconstruction algorithm, iterative reconstruction algorithm, back projection algorithm, fan-beam reconstruction, deep learning reconstruction, and/or the like to generate the focused image.

Referring to FIG. 10, the fluid sampling and analyzing device 1002 generates a focused image 1010.

Referring back to FIG. 9, subsequent to and/or in response to step/operation 907, the example method 900 proceeds to step/operation 909. At step/operation 909, a processor component (such as, but not limited to, the processor component 602 of the example fluid sampling and analyzing device described in connection with FIG. 6 above) may determine estimated sample characteristics data associated with the fluid sample.

In some embodiments, the processor component of the example fluid sampling and analyzing device may apply machine learning models and/or computing algorithms on the reconstructed/focused digital holography image to determine estimated sample characteristics data associated with the fluid sample. For example, the processor component of the example fluid sampling and analyzing device may train a machine learning model (such as, but not limited to, artificial neural network, convolutional neural network, k nearest neighbor, decision tree, support vector machines) based on historical digital holography image and their corresponding sample characteristics data, and may provide the reconstructed/image to the machine learning model to generate estimated sample characteristics data.

In some embodiments, the estimated sample characteristics data comprises an estimated concentration level of white blood cells within the fluid sample. For example, the estimated sample characteristics data may indicate an estimated white blood cell count in the fluid sample, similar to various example embodiments described herein. Additionally, or alternatively, the estimated sample characteristics data comprises estimated size values of particles within the fluid sample. For example, the fluid sample may be PD effluent, and the processor component may train the machine learning model to calculate the size values of particles within the fluid sample.

Referring to FIG. 10, the fluid sampling and analyzing device 1002 transmits the estimated sample characteristics data 1012 to the remote computing server 1004 and/or the mobile computing device 1006.

Referring back to FIG. 9, subsequent to and/or in response to step/operation 909, the example method 900 proceeds to step/operation 911 and ends.

Figure 11:
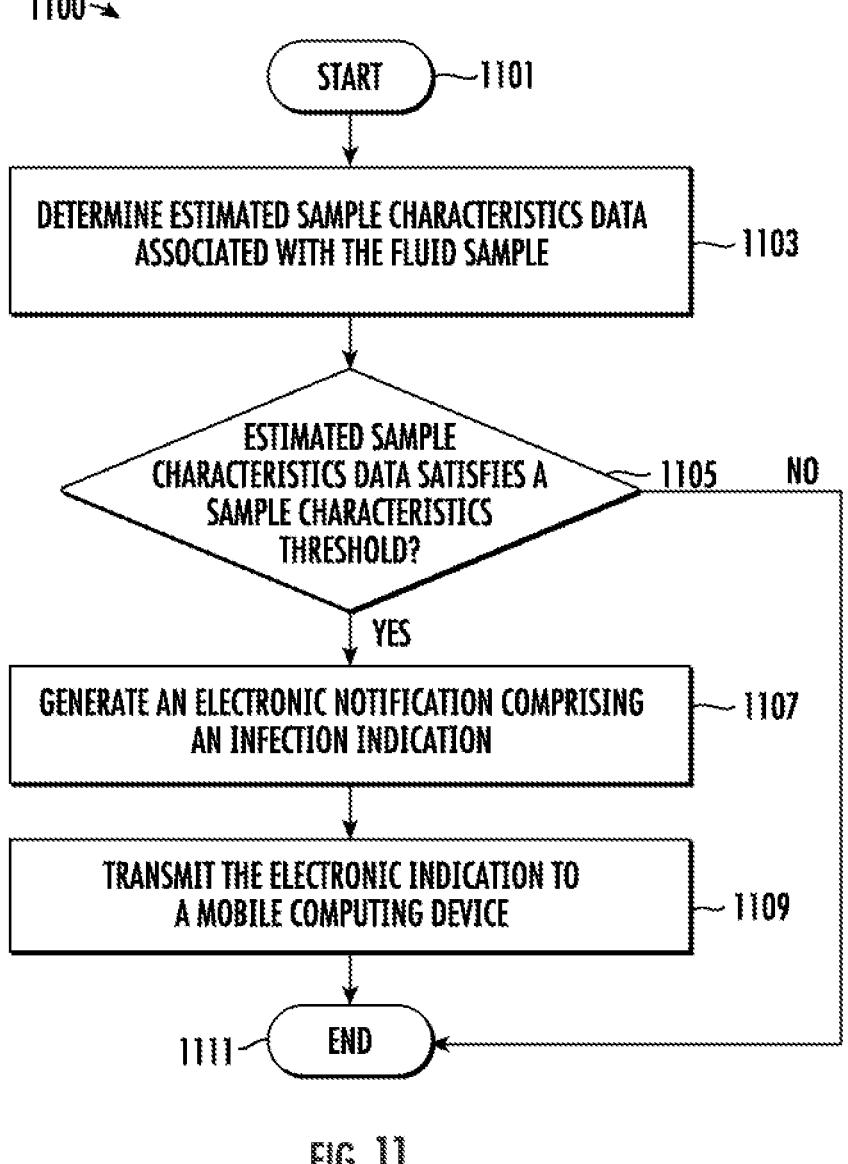
FIG. 11 is an example flow diagram illustrating an example method of apply estimated sample characteristics data in accordance with some example embodiments described herein.

Referring now to FIG. 11, an example method 1100 of applying estimated sample characteristics data in accordance with some example embodiments described herein is illustrated. In particular, FIG. 11 illustrates an example method of utilizing estimated sample characteristics data to determine whether there is an infection in a patent after a PD procedure.

In FIG. 11, the example method 1100 starts at step/operation 1101. In some embodiments, subsequent to and/or in response to step/operation 1101, the example method 1100 proceeds to step/operation 1103. At step/operation 1103, a processor component (such as, but not limited to, the processor component 602 of the example fluid sampling and analyzing device described in connection with FIG. 6 above) may determine estimated sample characteristics data associated with the fluid sample.

In some embodiments, the fluid sample is PD effluent, and the estimated sample characteristics data may be determined based on the PD effluent. In some embodiments, the processor component may determine the estimated sample characteristics data in accordance with various example methods described herein, including, but not limited to, those described above.

Referring back to FIG. 11, subsequent to and/or in response to step/operation 1103, the example method 1100 proceeds to step/operation 1105. At step/operation 1105, a processor component (such as, but not limited to, the processor component 602 of the example fluid sampling and analyzing device described in connection with FIG. 6 above) may determine whether estimated sample characteristics data satisfies a sample characteristics threshold.

In some embodiments, the sample characteristics threshold corresponds to a threshold where the estimated sample characteristics data indicates signs of infection based on the fluid sample (e.g. PD effluent). For example, if the estimated sample characteristics data comprises an estimated concentration level of white blood cells within the fluid sample (e.g. PD effluent), then the sample characteristics threshold may comprise a threshold concentration level of white blood cells in the fluid sample (e.g. PD effluent) that would indicate an infection. If the estimated concentration level of white blood cells in the fluid sample is higher than the threshold concentration level of white blood cells (the estimated sample characteristics data satisfying the sample characteristics threshold), it indicates that the patient may be suffering from an infection. If the estimated concentration level of white blood cells in the fluid sample is lower than the threshold concentration level of white blood cells (the estimated sample characteristics data not satisfying the sample characteristics threshold), it indicates that the patient may not be suffering from an infection.

Figure 12:
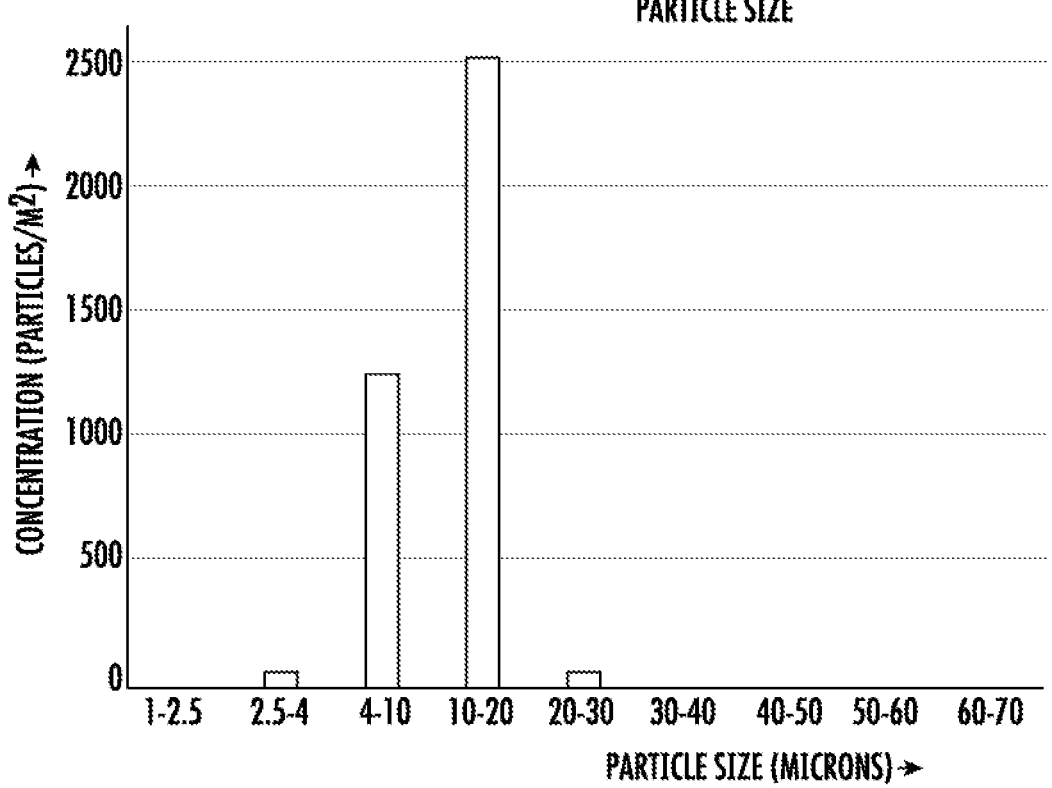
FIG. 12 is an example bar chart indicating an example distribution of estimated size values of example particles within an example fluid sample in accordance with some example embodiments described herein.

Additionally, or alternatively, if the estimated sample characteristics data comprises estimated size values of particles within the fluid sample, then the sample characteristics threshold may comprise a threshold size value of particles, which may correspond to the threshold size value of particles that would indicate an infection. If the estimated size values of particles within the fluid sample is higher than the threshold size value of particles (the estimated sample characteristics data satisfying the sample characteristics threshold), it indicates that the patient may be suffering from an infection. If the estimated size values of particles in the fluid sample is lower than the threshold size value of particles (the estimated sample characteristics data not satisfying the sample characteristics threshold), it indicates that the user may not be suffering from an infection. Referring now to FIG. 12, an example distribution diagram of sizes of particles in a fluid sample is illustrated.

Referring back to FIG. 11, if, at step/operation 1105, the processor component determines that the estimated sample characteristics data satisfies the sample characteristics threshold, the example method 1100 proceeds to step/operation 1107. At step/operation 1107, a processor component (such as, but not limited to, the processor component 602 of the example fluid sampling and analyzing device described in connection with FIG. 6 above) may generate an electronic notification comprising an infection indication.

For example, the processor component may generate an electronic notification indicating that the patient is likely suffering from an infection due to PD.

Referring back to FIG. 11, subsequent to and/or in response to step/operation 1107, the example method 1100 proceeds to step/operation 1109. At step/operation 1109, a processor component (such as, but not limited to, the processor component 602 of the example fluid sampling and analyzing device described in connection with FIG. 6 above) may transmit the electronic indication to a mobile computing device.

For example, the mobile computing device may be associated with the patient or a primary care physician. In some embodiments, the electronic notification can notify these people when the estimated sample characteristics data satisfies the sample characteristics threshold so that the users can take actions early on to address the infection.

Subsequent to and/or in response to step/operation 1109, the example method 1100 proceeds to step/operation 1111 and ends.

If, at step/operation 1105, the processor component determines that the estimated sample characteristics data does not satisfy the sample characteristics threshold, the processor component determines that the patient may not be suffering from an infection. In such an example, the example method 1100 proceeds to step/operation 1111 and ends.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for analyzing fluid samples, the apparatus comprises:

a fluid imaging chamber comprising a flow channel for receiving a fluid sample;

at least one illumination source component configured to emit at least one light beam; wherein the at least one light beam is directed through the fluid sample in the flow channel from a top surface of the fluid imaging chamber;

an angled mirror positioned above the fluid imaging chamber to redirect the at least one light beam vertically into the fluid imaging chamber; and an image sensor component positioned under a bottom surface of the fluid imaging chamber, wherein the image sensor component is configured to generate lens-less digital holography image data of the fluid sample.

2. The apparatus of claim 1, wherein the fluid imaging chamber is removable.

3. The apparatus of claim 1, wherein the fluid imaging chamber comprises a fluidic inlet and a fluidic outlet, wherein the fluidic inlet is connected to a fluid input conduit for injecting the fluid sample to the flow channel, wherein the fluidic outlet is connected to a fluid output conduit for discharging the fluid sample from the flow channel.

4. The apparatus of claim 1, wherein the fluid sample is associated with peritoneal dialysis (PD) effluent.

5. The apparatus of claim 1, wherein the at least one light beam comprises coherent light, wherein the at least one illumination source component comprises a laser diode.

6. The apparatus of claim 1, wherein the at least one light beam comprises at least partially incoherent light, wherein the at least one illumination source component comprises a light emitting diode (LED).

7. The apparatus of claim 1, further comprising:

a processor component in electronic communication with the at least one illumination source component and the image sensor component, wherein the processor component is configured to:

cause the at least one illumination source component to emit the at least one light beam; and receive the lens-less digital holography image data from the image sensor component.

8. The apparatus of claim 7, wherein the processor component is configured to:

transmit the lens-less digital holography image data to a remote computing platform that generates estimated sample characteristics data associated with the fluid sample based at least in part on the lens-less digital holography image data.

9. The apparatus of claim 8, wherein the estimated sample characteristics data comprises an estimated concentration level of white blood cells within the fluid sample.

10. The apparatus of claim 8, wherein the estimated sample characteristics data comprises estimated size values of particles within the fluid sample.

11. The apparatus of claim 7, wherein the processor component is configured to:

determine estimated sample characteristics data associated with the fluid sample based at least in part on applying at least one machine learning model on the lens-less digital holography image data.

12. A method for analyzing fluid samples comprising:

causing at least one illumination source component of a fluid sampling and analyzing device to emit at least one light beam, wherein the fluid sampling and analyzing device comprises a fluid imaging chamber comprising a flow channel for receiving a fluid sample, wherein the at least one light beam is directed through the fluid sample in the flow channel from a top surface of the fluid imaging chamber, wherein an angled mirror positioned above the fluid imaging chamber is configured to redirect the at least one light beam vertically into the fluid imaging chamber;

receiving lens-less digital holography image data from an image sensor component of the fluid sampling and analyzing device, wherein the image sensor component is positioned under a bottom surface of the fluid imaging chamber; and determining estimated sample characteristics data associated with the fluid sample based at least in part on applying at least one machine learning model on the lens-less digital holography image data.

13. The method of claim 12, wherein the fluid imaging chamber is removable from the fluid sampling and analyzing device.

14. The method of claim 12, wherein the fluid imaging chamber comprises a fluidic inlet and a fluidic outlet, wherein the fluidic inlet is connected to a fluid input conduit for injecting the fluid sample to the flow channel, wherein the fluidic outlet is connected to a fluid output conduit for discharging the fluid sample from the flow channel.

15. The method of claim 12, wherein the fluid sample is associated with peritoneal dialysis (PD) effluent.

16. The method of claim 12, wherein the at least one light beam comprises coherent light, wherein the at least one illumination source component comprises a laser diode.

17. The method of claim 12, wherein the at least one light beam comprises at least partially incoherent light, wherein the at least one illumination source component comprises a light emitting diode (LED).

18. The method of claim 12, wherein the estimated sample characteristics data comprises an estimated concentration level of white blood cells within the fluid sample.

19. The method of claim 12, wherein the estimated sample characteristics data comprises estimated size values of particles within the fluid sample.

20. The method of claim 12 further comprising:

transmitting the lens-less digital holography image data to a remote computing platform that generates the estimated sample characteristics data associated with the fluid sample based at least in part on the lens-less digital holography image data.

\* \* \* \* \*